(12) United States Patent
Yoshida

(10) Patent No.: US 6,359,934 B1
(45) Date of Patent: Mar. 19, 2002

(54) ADAPTIVE MODULATION METHOD

(75) Inventor: Makoto Yoshida, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/272,910

(22) Filed: Mar. 19, 1999

(30) Foreign Application Priority Data

Mar. 19, 1998 (JP) ............................................. 10-070797

(51) Int. Cl.[7] ...................... H03M 13/35; H03M 13/41; H04L 23/02; H04L 5/12; H03D 1/00
(52) U.S. Cl. ........................ 375/262; 375/298; 332/103; 370/234
(58) Field of Search ................................. 375/262, 341, 375/232, 295, 264, 298; 370/342, 230, 232, 233, 234, 235, 207, 278; 332/103

(56) References Cited

U.S. PATENT DOCUMENTS

| 5,896,374 A | * | 4/1999 | Okumura et al. ............ 370/311 |
| 5,896,419 A | * | 4/1999 | Suzuki ........................ 375/219 |
| 5,982,813 A | * | 11/1999 | Dutta et al. ................. 375/219 |
| 6,108,384 A | * | 4/2000 | Okumura et al. ........... 375/262 |
| 6,112,325 A | * | 8/2000 | Burshtein ................... 714/774 |
| 6,130,882 A | * | 10/2000 | Levin ......................... 370/252 |
| 6,134,278 A | * | 10/2000 | Abrishamkar et al. ...... 375/341 |
| 6,215,793 B1 | * | 4/2001 | Gultekin et al. ............ 370/465 |
| 6,292,920 B1 | * | 9/2001 | Nakano ....................... 714/774 |

* cited by examiner

*Primary Examiner*—Chi Pham
*Assistant Examiner*—Dung X. Nguyen
(74) *Attorney, Agent, or Firm*—Rosenman & Colin LLP

(57) ABSTRACT

Each modulation level estimating unit calculates mean or variance of a carrier wave power for received signals to which no modulation level information is added when being transmitted, and calculates the difference between the calculated mean or variance and a mean or variance at each modulation level, as one of likelihood function values $\Lambda_{ML\#1}$ through $\Lambda_{ML\#X}$ of each modulation level. A maximum likelihood function value selector selects the modulation level corresponding to the likelihood function value having the maximum likelihood value from among the likelihood function values, and makes a data selector select as a demodulation signal the output of a modulation level demodulating unit, which corresponds to the selected modulation level.

46 Claims, 15 Drawing Sheets

SYSTEM MODEL

SYSTEM MODEL

QPSK     16 QAM     64 QAM

EXAMPLES OF SIGNAL POINT ARRANGEMENTS
IMPLEMENTED WITH RESPECTIVE MODULATION
METHODS

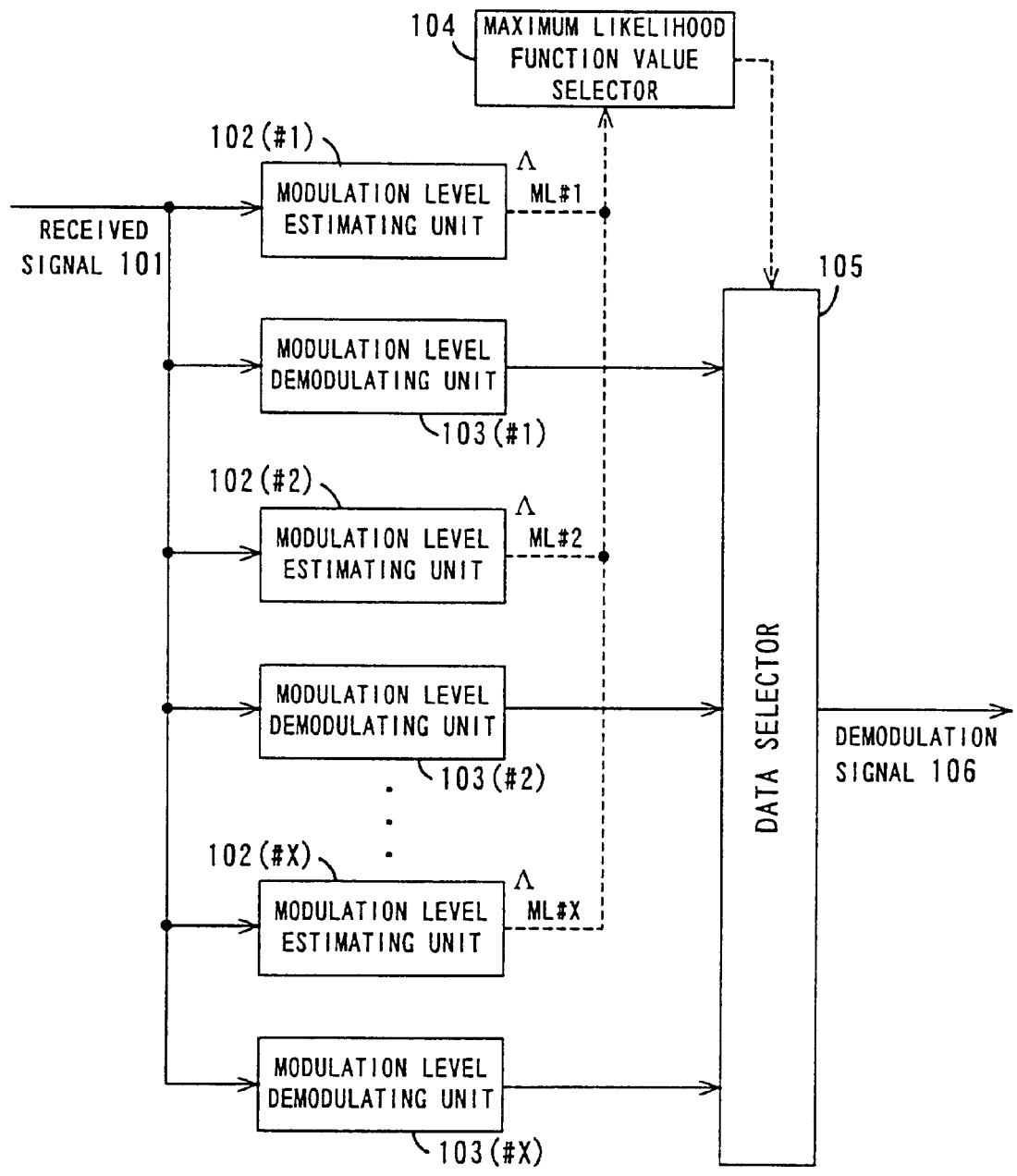
F I G. 2

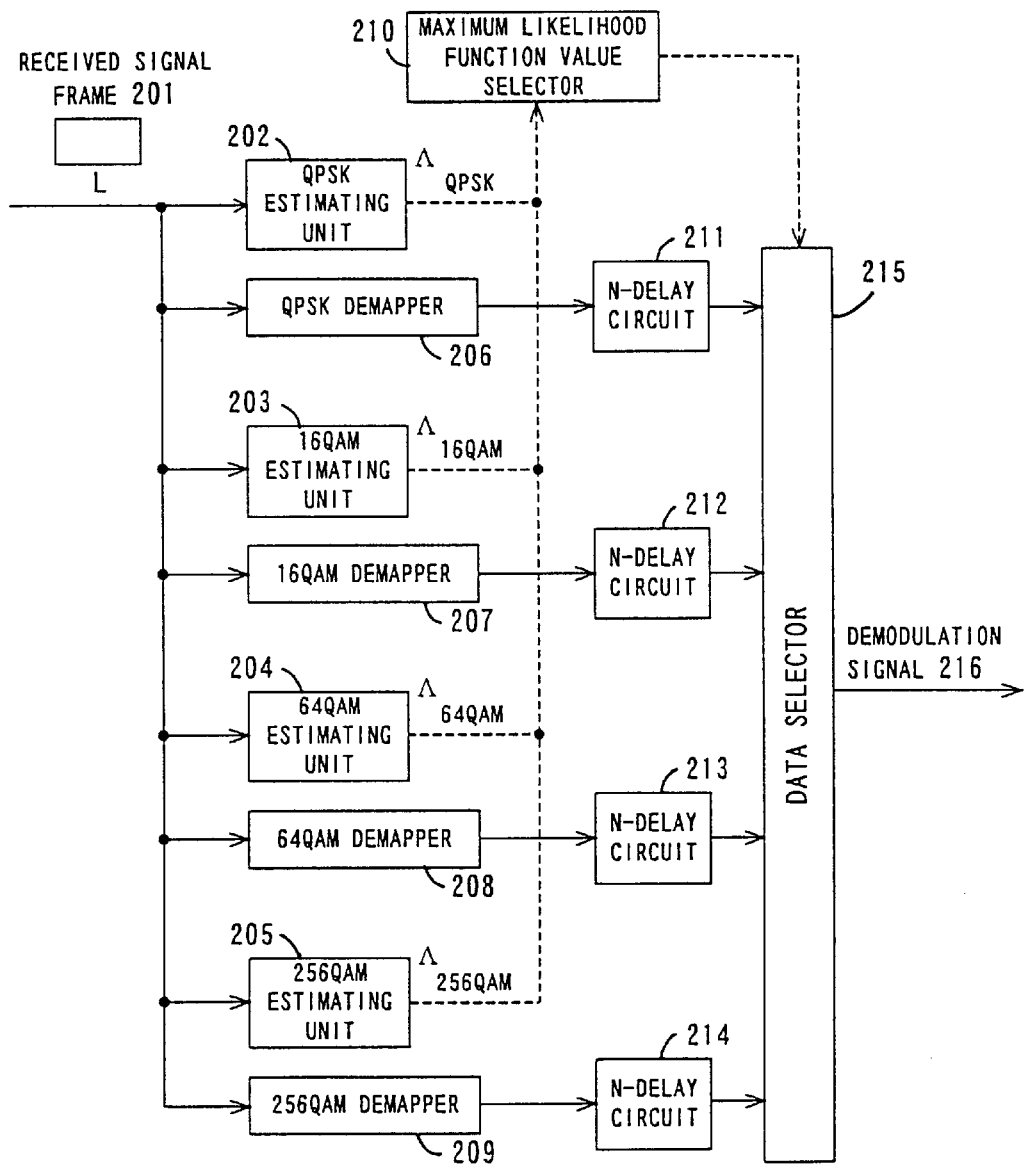
F I G. 3

CONVENTIONAL TECHNIQUE

PREFERRED EMBODIMENT

ML:Signals for Modulation Level
I:Information Signals

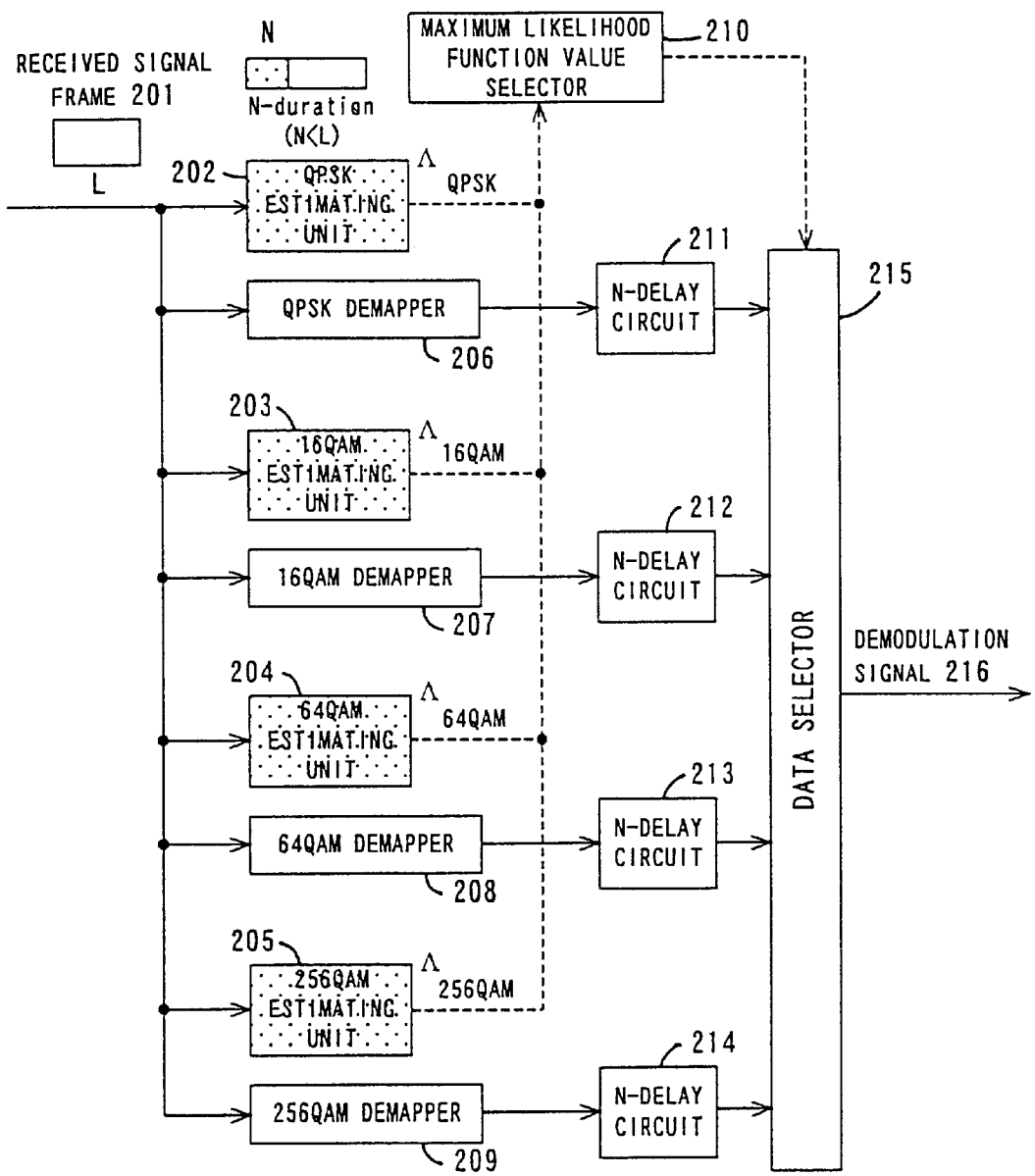
F I G. 5

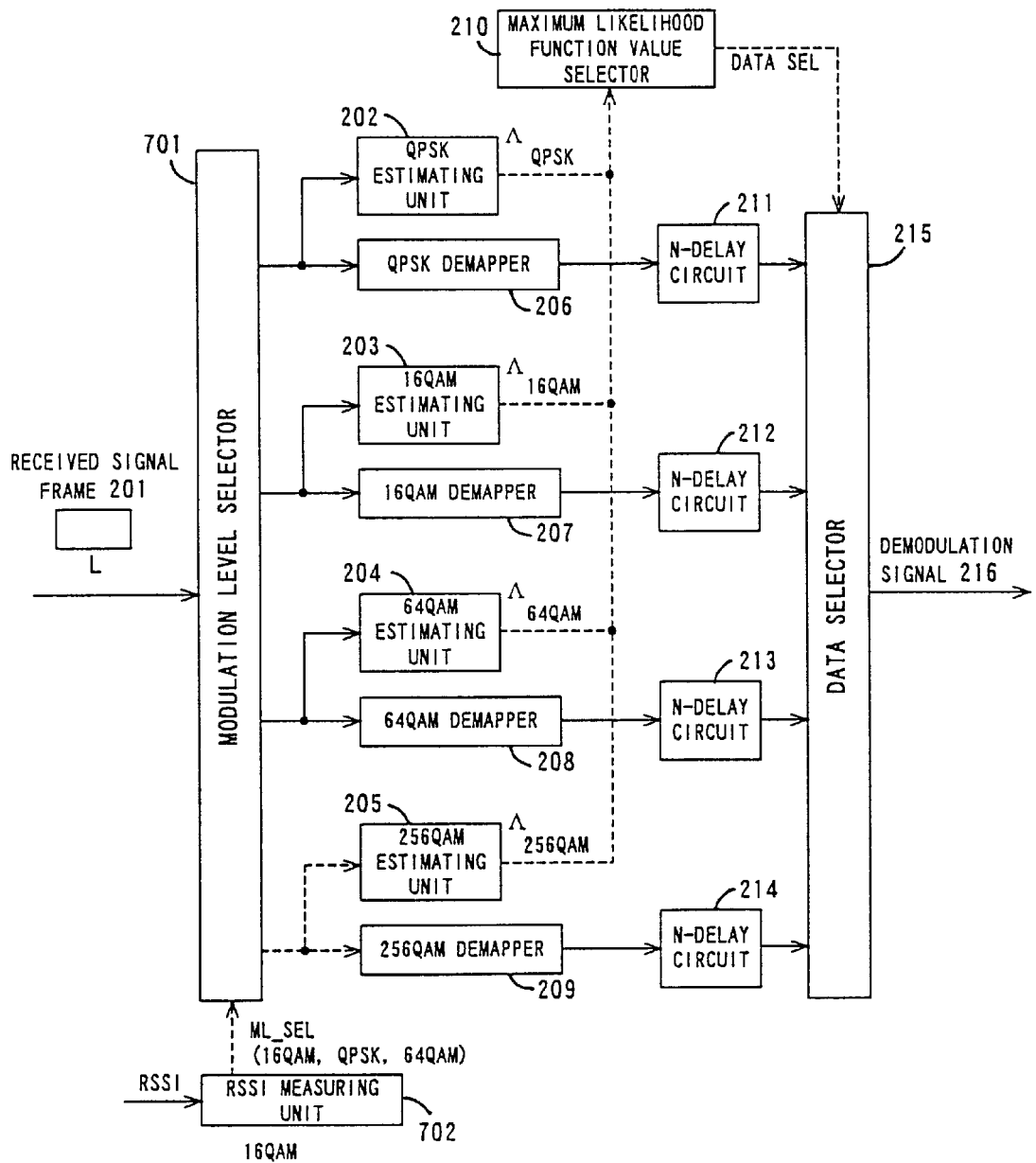
F I G. 8

ADAPTIVE MODULATION METHOD

BACKGROUND OF THE INVENTION

1. Field of the Invention

The present invention relates to an adaptive modulation method which can be applied to a mobile communications system, and more particularly to an adaptive modulation method for changing a modulation level based on a channel power gain.

2. Description of the Related Art

In digital communications, particularly in mobile communications systems, it is widely known that channel quality (such as a bit error rate) significantly degrades by variations in the received signal-to-noise ratio (SNR) due to fading. This phenomenon occurs when signal waves are affected by delayed signal waves including scattered signal waves. That is, the amplitude and the phase of a signal varies with time. The fading varies occur in the range of several tens of dBs.

The modulation method which is not adaptive to a fading channel (hereinafter referred to as a non-adaptive modulation method) is a method with which a modulation level (and a transmission power) is fixed. If this modulation method is applied, a fairly large link margin must be secured in order to maintain the channel quality allowed by the system in a time period during which the signal level drops due to fading (deep fades). To secure the link margin, for example, a strong error correction which trades off a transmission bandwidth must be applied. Namely, the system to which the non-adaptive modulation method is applied is effectively designed for the worst case channel conditions. Accordingly, with such a system, the channel capacity over fading channels cannot be efficiently utilized.

In recent years, an adaptive modulation method intended to efficiently utilize the capacity over a fading channel has been actively studied and developed.

The bit error rate performance of a modulation method depends on the distance between signal points implemented with the modulation method, that is, on Eb/No (or Es/No). This is common to any modulation methods.

Also an error correction technique intended to improve channel quality is a technique for regularly extending the distance between signal points by using redundant bits.

In fading channels, the probability of occurrence of the worst conditions is considerably small. That is, communications are made under the condition better than the maximum bit error rate allowed by the system in most of the total time. Accordingly, an optimum transmission can be realized by performing control so that the required bit error rate is maintained with an adaptive change of a transmission power level, a transmission symbol rate, a modulation level, a coding rate, or their combination, depending on a channel condition. This is the principle of an adaptive modulation method.

Adaptive modulation techniques provide high average spectral effectively by transmitting at high data rates with higher modulation levels under favorable channel conditions, and reducing throughput via lower modulation levels or transmission-off as the channel degrades.

The measurement of the channel condition can be performed by the instantaneous received SNR and the average received SNR.

FIG. 1A shows the principle of the adaptive modulation method. In this figure, x(i) is a transmission signal output from a transmitter 1501 at a station A which is a first station, y(i) is a received signal received by a receiver 1503 at a station B which is a second station opposing the station A, g(i) is a time-varying gain due to fading, and n(i) is an additive white Gaussian noise (AWGN).

For a bidirectional communications system, two sets of the system shown in FIG. 1A, which has reverse transmission directions, are included.

If the channel 1502 is a channel on which the fading of the link in the first direction (from the station A to the station B) correlates with that of the link in the second direction (from the station B to the station A), for example, a TDD (Time Division Duplex) channel, the following control operations are performed.

A channel estimator 1506 within the receiver 1503 at the station B on the first direction link estimates the power gain of the channel 1502, and notifies of the estimated channel information a demodulator/decoder 1507 within the receiver 1503 at the station B. The demodulator/decoder 1507 demodulates/decodes the received signal y(i) received from the first direction link after equalization based on the estimated channel information. Furthermore, the channel estimator 1506 within the receiver 1503 at the station B notifies an adaptive modulator/encoder 1504 within the transmitter 1501 at the station B on the second direction link, of the estimated channel information (or the estimated information obtained by applying an extrapolation-interpolation to the estimated power gain). The adaptive modulator/encoder 1504 sets the modulation level information according to the notified estimated channel information, and sends the transmission signal x(i) along with the modulation level information to the second direction link on the channel 1502.

The channel estimator 1506 within the receiver 1503 at the station A on the second direction link estimates the power gain of the channel 1502, and notifies of the estimated channel information the demodulator/decoder 1507 within the receiver 1503 at the station A. The demodulator/decoder 1507 demodulates/decodes the received signal y(i) received from the second direction link after equalization based on the estimated channel information. Additionally, the channel estimator 1506 within the receiver 1503 at the station A notifies the adaptive modulator/encoder 1504 within the transmitter 1501 at the station A on the first direction link, of the estimated channel information (or the estimated information obtained by applying an extrapolation-interpolation to the estimated power gain). The adaptive modulator/encoder 1504 sets the modulation level information according to the notified estimated channel information, and sends the transmission signal x(i) along with the modulation level information to the first direction link on the channel 1502.

In this way, a reciprocating transmission of the modulation level information can be implemented.

In the meantime, if the channel 1502 is a channel on which the fading of the first direction link does not correlate with that of the second direction link, for example, an FDD (Frequency Division Duplex) channel, the following control operations are performed.

First of all, the channel estimator 1506 within the receiver 1503 at the station B on the first direction link estimates the power gain of the channel 1502, and notifies of the estimated channel information the demodulator/decoder 1507 within the receiver 1503 at the station B. The demodulator/decoder 1507 demodulates/decodes the received signal y(i) received from the first direction link after equalization based on the estimated channel information. Additionally, the channel estimator 1506 within the receiver 1503 at the station B feeds back its estimated channel information (or the estimated information obtained by applying an extrapolation-interpolation to the estimated power gain) to the adaptive modulator/encoder 1504 within the transmitter 1501 (shown in FIG. 1A) at the station A on the first direction link by using a feedback channel 1508 for the first direction link. The adaptive modulator/encoder 1504 sets the fed-back modulation level information, and sends the transmission signal x(i) along with the modulation level information to the first direction link on the channel 1502.

Also the second direction link requires exactly the same feedback mechanism as that described above.

In FIG. 1A, a power controlling unit 1505 within the transmitter 1501 implements the above described power adaptation process.

FIG. 1B exemplifies the signal point arrangements implemented with respective modulation methods which can be selected by the adaptive modulator/encoder 1504 within the transmitter 1501 and the demodulator/decoder 1507 within the receiver 1503. As the modulation methods, QPSK (Quadri-Phase Shift Keying), 16 QAM (16 Quadrature Amplitude Modulation), 64 QAM, etc. can be selected.

Since the adaptive modulation method requires the processing unit for adaptively controlling a modulation method as described above, it has the trade-off between the performance and the complexity unlike the non-adaptive modulation method.

With the above described conventional adaptive modulation method, the modulation level information set by the adaptive modulator/encoder 1504 within the transmitter 1501 must be added as a control signal on the transmission signal x(i) sent by the transmitter 1501, as stated before. Therefore, the transmission efficiency degrades.

This control signal must be sent every state change period (such as every normalized maximum fading frequency). Because an error of the control signal causes the entire received information for one period (one block) to be lost, the error rate of the control signal must be decreased to a fairly low level. Accordingly, the conventional adaptive modulation method requires also the redundancy for correcting an error of the control signal.

Up to now, also the method for preventing the transmission efficiency from decreasing by embedding the modulation level information in the control signal (such as a preamble) used for another purpose, and (not by estimating but) by demodulating the control signal on a receiving side has been proposed. This method, however, imposes a restriction on the pattern of the control signal, which leads to a lack of generality and universality.

SUMMARY OF THE INVENTION

The present invention was developed in the above described background, and aims at preventing the transmission efficiency of a signal from decreasing by allowing the maximum likelihood estimation of a modulation level to be made on a receiving side without transmitting any control signal from a transmitting side, particularly in an adaptive modulation method for changing a modulation level based on a channel power gain.

The present invention assumes a radio transmission technology for adaptively changing a modulation level according to the state of a transmission path.

A first aspect of the present invention has the following configuration.

First of all, the mean or the expectation value of a carrier wave power is calculated for received signals to which no modulation level information is added when being sent.

Next, the difference between the calculated mean or expectation of the carrier wave power of received signals, and a mean or an expectation of the carrier wave power, which is prescribed for each modulation level, is calculated as the likelihood of each modulation level.

Then, the modulation level corresponding to the maximum likelihood value among the likelihood values of respective modulation levels is estimated as the modulation level of the received signals.

With the configuration according to the first aspect of the present invention, the differences between average CNRs of respective modulation levels when a bit error rate (that is, an instantaneous Es/No) is made constant, are considered and the likelihood values based on these differences are used, so that the maximum likelihood estimation of a transmitted modulation level can be made only from received signals without obtaining the conventionally required modulation level information when the signals are transmitted, in a radio transmission technology for adaptively changing the state of a transmission path within a system expected to be operated under a fading environment such as a mobile communications environment, etc.

Namely, with the above described configuration according to the present invention, the absolute value of a likelihood value, that is, the dynamic range of the likelihood value can be reduced by performing a likelihood calculation for each received symbol, thereby saving computer resources in an actual apparatus.

A second aspect of the present invention has the following configuration.

First of all, the variance of a carrier wave power is calculated for received signals to which no modulation level information is added when being sent.

Then, the difference between the calculated variance of the carrier wave power of received signals and a variance of the carrier wave power, which is prescribed for each modulation level, is calculated to be a likelihood of each modulation level.

Then, the modulation level corresponding to the maximum likelihood value among the likelihood values of respective modulation levels is estimated as the modulation level of the received signals.

With the above described configuration according to the second aspect of the present invention, the maximum likelihood estimation of a modulation level can be made with a higher accuracy only from received signals by considering the differences between the variances of signal points at respective modulation levels, and by using the likelihood values based on these differences.

A third aspect of the present invention has the following configuration.

First of all, the sample variance of the carrier wave power is calculated for signals to which no modulation level information is added when being sent.

Next, the difference between the calculated sample variance of the carrier wave power of received signals and a sample variance of the carrier wave power, which is prescribed for each modulation level, is calculated to be the likelihood of each modulation level.

Then, the modulation level corresponding to the maximum likelihood value among the likelihood values of respective modulation levels is estimated as the modulation level of the received signals.

With the above described configuration according to the third aspect of the present invention, the maximum likelihood estimation of a modulation level can be made with a higher accuracy only from received signals by using a likelihood value based on the distance between the sample variance of a signal point of received signals, and the sample variance at each modulation level.

A fourth aspect of the present invention has the following configuration.

The variance of a carrier wave power is calculated for the received signals to which no modulation level information is added when being transmitted.

Next, the difference between the calculated variance of the carrier wave power of received signals and a sample variance of the carrier wave power, which is prescribed for each modulation level, is calculated to be the likelihood of each modulation level.

Then, the modulation level corresponding to the maximum likelihood value among the likelihood values of respective modulation levels is estimated as the modulation level of the received signals.

With the above described configuration according to the fourth aspect of the present invention, the maximum likelihood estimation of a modulation level can be made with a higher accuracy and a higher operation efficiency only from received signals by using the likelihood value based on the distance between the variance of a signal point of received signals and the sample variance at each modulation level.

In the configurations of the present invention described so far, an estimation block length of a signal sent at a same modulation level can be set according to an estimation error rate allowed by a system. This also means that if a block length is set based on a fading cycle, the estimated number of symbols (block length) can be set to an arbitrary value which is equal to or smaller than the estimated number.

As a result, since a period (such as a normalized maximum fading frequency) for which a modulation level is desired to be changed becomes longer particularly in a moderate or high-speed system, the estimation of a modulation level can be made with a higher accuracy by estimating the modulation level on the entire period. Additionally, an estimation block length can be shortened without changing an allowed estimation error rate in this case, which leads to the reduction in the complexity.

In the configurations of the present invention described so far, a received signal level is obtained, so that the modulation level range in which a likelihood value is calculated can be restricted based on the obtained received signal level.

Consequently, the amount of the entire estimation calculation process can be reduced.

In the configurations of the present invention described so far, the modulation level range in which a likelihood value is calculated can be restricted when a current estimation is made, based on the modulation level which is most recently estimated.

As a result, the amount of the entire estimation calculation process can be reduced.

In the configurations of the present invention described so far, a subsequent estimation operation of a likelihood value at a corresponding modulation level can be suspended if the information about the distance between signal points, which is calculated by a different maximum likelihood value determination algorithm, exceeds a certain threshold value.

Consequently, the amount of the entire estimation process can be reduced.

In the configurations of the present invention described so far, a non-adaptive modulation method can be implemented by fixedly setting a modulation level at the time of a transmission.

In consequence, the real coexistence of an adaptive and a non-adaptive modulation method can be realized in a system where, for example, the adaptive modulation method is employed only in one direction although both of the methods coexist, or the maximum commonality can be provided to both a base station and a terminal in a system where the adaptive modulation method is employed in both directions.

BRIEF DESCRIPTION OF THE DRAWINGS

One skilled in the art can easily understand additional features and objects of this invention from the description of the preferred embodiments and some of the attached drawings. In the drawings:

FIG. 2 is a block diagram showing the principle of the present invention;

FIG. 3 is a block diagram showing the configuration of a first preferred embodiment according to the present invention;

FIG. 5 explains the operations of the first preferred embodiment according to the present invention;

FIG. 8 shows the configuration utilizing an RSSI signal, according to a third preferred embodiment of the present invention;

DESCRIPTION OF THE PREFERRED EMBODIMENTS

Figure 1A:
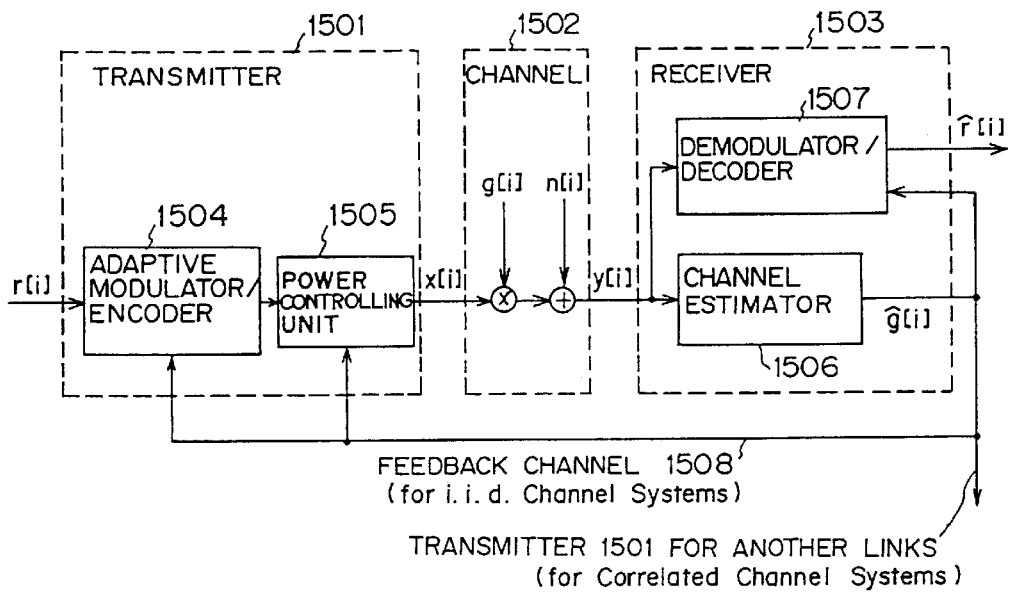
FIGS. 1A and 1B explain the principle of an adaptive modulation method.
Figure 1B:
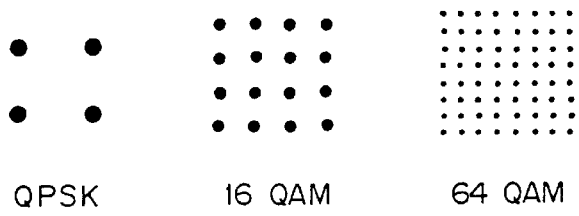

Provided hereinafter are the explanations about the details of the preferred embodiments according to the present invention, by referring to the drawings.

First Principle of the Present Invention

FIG. 2 shows the principle of the present invention.

The present invention considers the differences between average CNRs of respective modulation levels.

Assume that a Square-QAM modulation method is adopted. If its modulation levels are 2(QPSK), 4(16 QAM), and 6(64 QAM) in this case, their average CNRs are respectively $\gamma_{QPSK=\delta/\sigma N}^2$, $\gamma_{16\ QAM}=5\delta/\sigma_N^2$, and $\gamma_{64\ QAM}=21\delta/\sigma_N^2$. Here, $2\delta$ is the (minimum) distance between signal points, while $\sigma^2$ is a variance of thermal noise. The theoretical values of the respective average bit error rates are calculated based on these average CNRs.

As is known from these values, the average CNRs of the respective modulation levels differ on the condition that the symbol error rates are made equal by making the distances between signal points and the thermal noise, that is, Es/No identical. The present invention utilizes this fact.

Specifically, according to the first principle of the present invention, the power of a received signal is measured by using as standard offset values the average carrier wave powers ($P_{ML}$s) such as $P_{QPSK}=2.0$, $P_{16\ QAM}=10.0$ and $P_{64\ QAM}=42.0$ at the respective modulation levels when no thermal noise exists ($\sigma_N^2 \to 1$) and the distance between signal points is 2. Here, the state change period (hereinafter referred to as a block length) preset by a system is defined to be "L", the number of symbols used for making an estimation (estimation block length) is defined to be "N" ($L \geq N$), and the received signal point at a time point "i" is defined to be r(i). In this case, the likelihood function $\Lambda_{ML}$ of each modulation level (ML) is represented by the following equation.

$$\Lambda_{ML} = \left| N - P_{ML} - \sum_{i}^{N} r_{(i)}^2 \right| \quad (1)$$

Accordingly, the likelihood functions $\Lambda_{QPSK}$, $\Lambda_{16\ QAM}$, and $\Lambda_{64\ QAM}$ are respectively represented by the following equations.

$$\Lambda_{QPSK} = \left| N - P_{QPSK} - \sum_{i}^{N} r^2(i) \right|, \quad (2)$$

$$\Lambda_{16QAM} = \left| N - P_{16QAM} - \sum_{i}^{N} r^2(i) \right|, \quad (3)$$

$$\Lambda_{64QAM} = \left| N - P_{64QAM} - \sum_{i}^{N} r^2(i) \right|, \quad (4)$$

According to the first principle of the present invention, the function having the minimum value (the maximum likelihood value) among likelihood functions $\Lambda_{ML}$ corresponding to respective modulation levels is used as an estimation result of a modulation level.

Namely, modulation level estimating units 102 #1 through #X calculate likelihood functions $\Lambda_{ML\#1}, \Lambda_{ML\#2}, \ldots, \Lambda_{ML\#X}$ from received signals 101 based on the equation (1) (the specific examples of which are the equations 2 through 4).

Additionally, modulation level demodulating units 103 #1 through #X perform demodulation processes corresponding to the respective modulation levels ML#1, ML#2, ... ML#X for the respective levels.

Then, a maximum likelihood function value selector 104 selects the function having the minimum value from among the likelihood functions $\Lambda_{ML\#1}, \Lambda_{ML\#2}, \ldots, \Lambda_{ML\#X}$ output from the modulation level estimating units 102 #1 through #X, and makes a data selector 105 output as a demodulation signal 106 the output of the modulation level demodulating unit 103, which corresponds to the minimum value.

Note that, however, the variances of signal points at respective modulation levels when identical measurement symbols are used are different from one another even if the variance of thermal noise is the same. This is because the number of sample symbols must be set to a larger value with the increase of a modulation level in order to make the frequency of occurrence of all the signal points at a certain modulation level same when a random information source is assumed. For example, there is the following relationship between the variances of average carrier wave powers at respective modulation levels when the number of samples is "N", which are represented by the equations 2 through 4.

$$\sigma_{P_{QPSK}}^2 < \sigma_{P_{16QAM}}^2 < \sigma_{P_{64QAM}}^2 \quad (5)$$

This means that the present invention is based on Law of Large Numbers, and a variance $\sigma^2 P_{ML}$ of an average carrier wave power (mean) at each modulation level approaches "0" and a sample average value $\bar{r}^2$ over the "N" samples approaches the mean, as "N" is set to a larger number.

As described above, according to the first principle of the present invention, each likelihood function value is calculated on the condition that the number of samples "N" is set to a same value. Therefore, two parameters such as the variance $\sigma^2$ of thermal noise (which is common to respective modulation levels), and the variance $\sigma^2 P_{ML}$ of the carrier wave power (mean) of each modulation level must be considered.

The former variance depends on Es/No, while the latter variance depends on a modulation level (particularly on the modulation level having a maximum transmission efficiency). Especially, for the latter variance, if a sufficient number of samples cannot be measured (if "N" is small), a transmission error (an irreducible error) can occur even if there is no thermal noise. As a matter of course, if the number of measurement samples is small although the former variance (used for a conventional Viterbi decoding algorithm as a model assumption) is large, an estimation accuracy degrades.

Accordingly, an estimation error of a modulation level, which is caused by the above described interaction, can be prevented from occurring if the number of samples "N" is set to some large value.

When a system is designed, the number of samples "N", which satisfies the allowed value of an estimation error rate, is determined not only from the normalized maximum fading frequency viewpoint, but also from the block error rate (or the modulation level estimation error rate) viewpoint.

By way of example, with the 64 QAM modulation method having the maximum transmission efficiency among the above described combination of the modulation levels, the estimation error rate is increased to as high as approximately $4 \times 10^{-4}$ when the number of symbols "N" is 30.

The above described number of symbols N=30 is the number equivalent to that of per pilot period (several tens of symbols), for example, if the transmission speed is lower than that of a pilot signal period "L" used for fading compensation. If the transmission speed is medium or high, the number of symbols becomes considerably smaller than that of per pilot period (several hundreds to several thousands of symbols).

That is, if a modulation level is changed with a pilot signal period, an estimation with a fairly high accuracy (errorless estimation) can be implemented particularly at a moderate or high-speed.

Described above is the fundamentals of the first principle of the present invention.

In a demodulation process of a modulation method with a high modulation level, particularly, the demodulation process of the QAM modulation method, a signal point is determined based on a threshold of the distance between signal points. In this case, the coordinate of a received signal in a signal space, and that of the signal point closest thereto are used as input information. Therefore, the units performing the calculations, which are additionally arranged when the present invention is applied, are only three units: a unit for calculating a power value (square value) of a received signal, a unit for making an accumulation in one block, and a unit for adding (to be more exact, subtracting) an offset value of an average carrier wave power of an estimated modulation level. Note that, however, the number of sets of this configuration, which corresponds to the number of estimated modulation levels, must be prepared.

This is the specific example of the configuration according to the first principle of the present invention.

Here, the equation (1) can be transformed into the following equation having the form of the sum of calculation equations for respective symbols.

$$\Lambda_{ML} = \left| \sum_{i}^{N} (P_{ML} - r^2(i)) \right| = \left| \sum_{i}^{N} \lambda_i \right| \quad (6)$$

where $\lambda$ is a branch metric value for estimating a modulation level. Since the branch metric value is the difference (relative value) between an average carrier wave power and a received signal power, the dynamic range where a calculation is made can be reduced in comparison with the method for respectively calculating the sum of the average carrier wave power and the sum of the received signal power and for calculating their difference as represented by the equation (1). As a result, computer resources in an actual system can be reduced.

Described above is the first modified embodiment of the present invention.

Additionally, in a current system, a received signal level is measured with signals such as an AGC signal, an RSSI signal, etc. For an actual communication, links are designed in consideration of a path loss. If received signal level errors are within a certain range, these information can be used as side information. For example, if a certain received signal level can be measured, there is no need to estimate all of modulation levels that a system sets by calculating the likelihood function values which correspond to the modulation level transmitted at the measured level and to the modulation levels to be transmitted at the levels preceding and succeeding the measured level. As a result, the total amount of computation can be reduced.

Described above is the second modified embodiment according to the first principle of the present invention.

Additionally, a system where a fading frequency is relatively small compared with symbol duration such as in a high-speed transmission can be configured so that, for example, up/down control (that is, an increment/decrement by 1 level) of a modulation level can be made. In this case, it is sufficient to consider only the modulation level changes in three states such as "±1" and "0" at each control timing of a modulation level. In such a system, a most recently estimated values is stored in a memory (or only an initial value is first stored, and thereafter, only the difference between the initial value and a newly estimated value is stored), and only the three states such as "±1" and "0" are recognized as currently estimated value for the stored estimated value, thereby reducing the total amount of computation.

Described above is the third modified embodiment according to the first principle of the present invention.

The present invention is a method for estimating the maximum likelihood value of a modulation level. If the present invention is considered to be integrated with a different maximum likelihood value determination method such as an error correction (including coded modulation) and a Viterbi algorithm for fading compensation (equalization, etc.), its adaptability is high. In such a system, if a conventional branch metric value (the distance between signal points) exceeds a certain threshold when an estimation is made at one modulation level, the total amount of computation can be reduced by suspending a subsequent calculation for this modulation level. Assuming that a 64 QAM signal is sent and a QPSK signal is estimated, it is evident that the distance between signal points (of the most closest signal and the received signal) becomes significantly large upon receipt of a signal point with high power. In such a case, the number of estimation errors can be reduced by suspending the calculation operation based on the determination process including a determination of tolerance up to some degree.

Described above is the fourth modified embodiment according to first principle of the present invention.

Furthermore, the present invention is a technique for estimating a modulation level only with the information obtained on a receiving side, and uses no other control information, that is, no other transmission signals like one of the above described conventional techniques. Therefore, the present invention can be applied to a non-adaptive modulation system only by fixedly setting a modulation level. Namely, this means that the real coexistence of both of adaptive and non-adaptive modulation methods is realized in a system where both of the modulation methods coexist, and, for example, the adaptive modulation method is adopted only in one direction, while the maximum commonality can be obtained both at a base station and at a terminal in a system where the adaptive modulation method is adopted in both directions.

Described above is the fifth modified embodiment according to the first principle of the present invention.

Preferred Embodiments According to the First Principle of the Present Invention

Provided below is the explanation about the details of the preferred embodiments according to the first principle of the present invention.

In the following preferred embodiments, the adaptive modulation method for which any of a modulation level 2 (QPSK modulation method), a modulation level 4 (16 QAM modulation method), a modulation level 6 (64 QAM modulation method), and a modulation level 8 (256 QAM modulation method) can possibly be selected is adopted.

FIG. 3 is a block diagram showing a first preferred embodiment according to the present invention, which corresponds to the principle of the configuration according to the present invention shown in FIG. 2.

A QPSK estimating unit 202, a 16 QAM estimating unit 203, a 64 QAM estimating unit 204, and a 256 QAM estimating unit 205 calculate likelihood functions $\Lambda_{QPSK}$, $\Lambda_{16QAM}$, $\Lambda_{64QAM}$, and $\Lambda_{256QAM}$ from a received signal frame 201 based on the above described equations (2) through (4) (also for the 256 QAM) for each of the modulation levels 2, 4, 6, and 8.

A QPSK demapper 206, a 16 QAM demapper 207, a 64 QAM demapper 208, and a 256 QAM demapper 209 perform demodulation processes corresponding to the respective modulation levels, and temporarily store the demodulation results in N-delay circuits 211, 212, 213, and 214.

Then, a maximum likelihood function value selector 210 selects the likelihood function having the minimum value from among the likelihood functions $\Lambda_{QPSK}$, $\Lambda_{16QAM}$, $\zeta_{64\ QAM}$, and $\Lambda_{256\ QAM}$, and makes a data selector 215 output as a demodulation signal the output of one of the N-delay circuits 211 through 214, which corresponds to the minimum value.

FIG. 4 exemplifies the format of a transmission signal sent from a transmitting side according to the preferred embodiment, and compares with the format of a conventional technique. For ease of explanation, a fading compensation control signal, etc. are omitted.

Figure 4A:
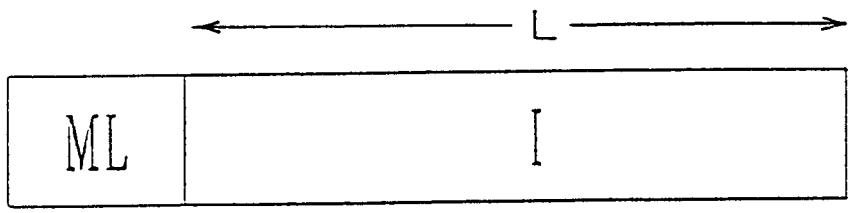
FIG. 4 shows the comparison between a conventional transmission format and a transmission format according to the first preferred embodiment of the present invention.

The transmission format of the conventional technique shown in FIG. 4A includes a modulation level signal ML every modulation level changing period (such as a normalized maximum fading frequency) in addition to an information signal I.

Figure 4B:
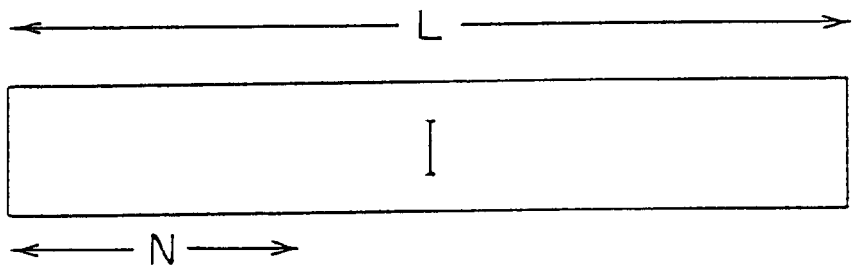

In the meantime, the transmission format according to the preferred embodiment shown in FIG. 4B includes not a modulation level signal but an information signal with the modulation level depending on a channel condition for each period determined by a system. By estimating a modulation level for each period described above (1 block=N symbols), demodulation (and decoding) can be performed without using a reference signal.

FIG. 5 shows the operations of the preferred embodiment illustrated in FIG. 3 when the number of symbols "N", which attains an estimation error rate allowed by a system, is smaller than the above described "L".

Since an estimation is made by using the likelihood function values calculated from symbols the number of which is smaller than "L" on a receiving side in this case, there is no need to perform calculations for all of the "L" symbols in one block. Additionally, an estimation accuracy which is relatively higher than that of a conventional system can be implemented if calculations are performed for all of the "L" symbols (when "N" is set to "L").

Figure 6:
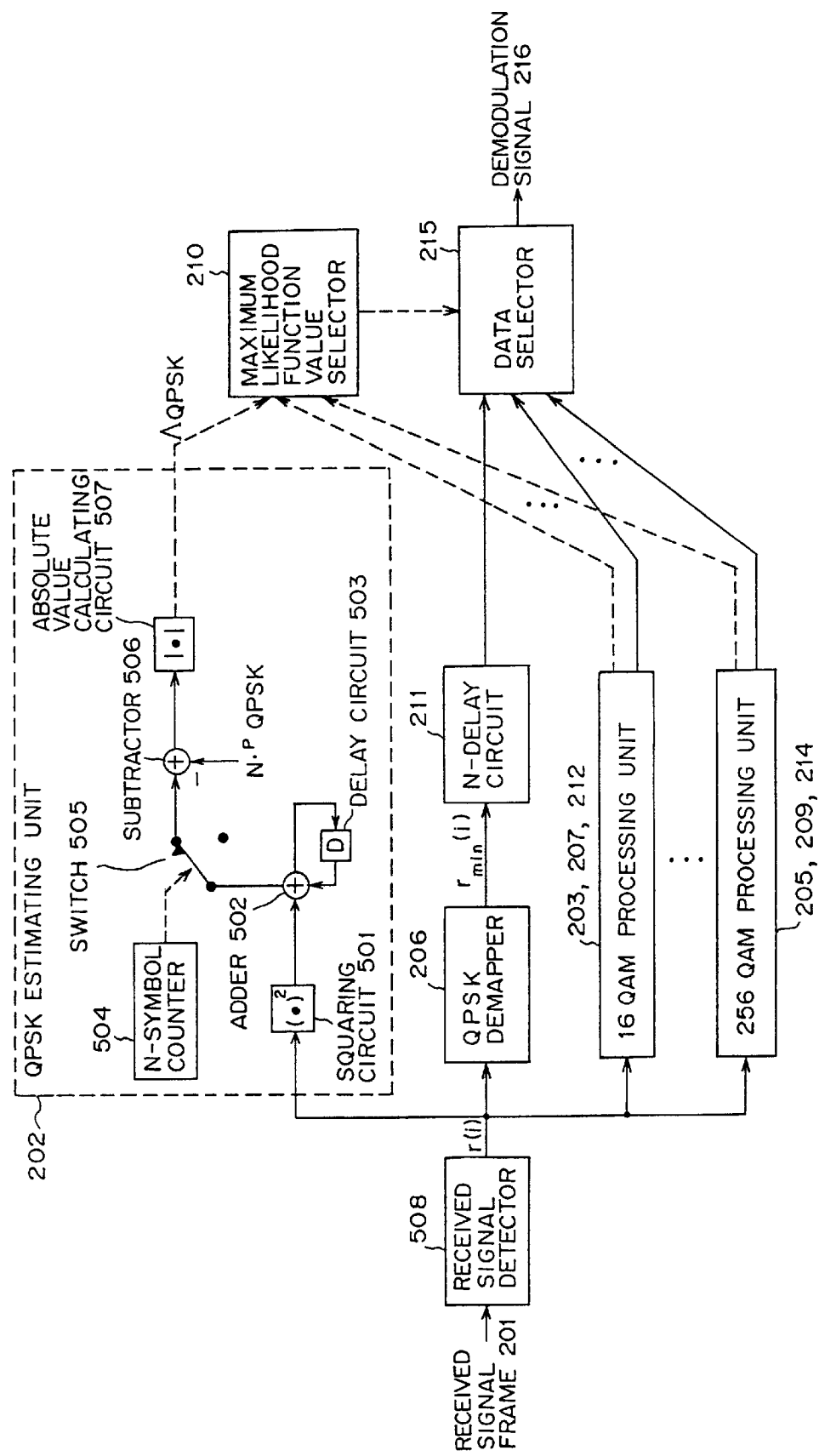
FIG. 6 shows the configuration of each estimating unit according to the first preferred embodiment of the present invention.

FIG. 6 shows the specific configuration of the circuits of the respective estimating units 202, 203, 204, and 205.

In the configuration shown in FIG. 6, a squaring circuit 501 calculates a received signal power value $r^2(i)$ by performing a square operation for the received signal r(i) (i=1, 2, ..., N) output from a received signal detector 508 according to the above described equation (1).

Then, an accumulator composed of an adder 502 and a delay circuit 503 sequentially accumulates the received signal power value $r^2(i)$ output from the squaring circuit 501. This corresponds to the operation of the term Σ on the right side of the equation (1).

Next, the accumulated value is output from a switch 505 when an N symbol counter 504 counts N symbols for one block.

A subtractor 506 then subtracts the accumulated value from an average carrier wave power value $P_{ML}$ (ML=QPSK, 16 QAM, 64 QAM, or 256 QAM) of each modulation level. Additionally, an absolute value calculating circuit 507 calculates the absolute value of the resultant subtraction value, and outputs the calculated absolute value as a likelihood function $\Lambda_{ML}$ (ML=QPSK, 16 QAM, 64 QAM, or 256 QAM).

Figure 7:
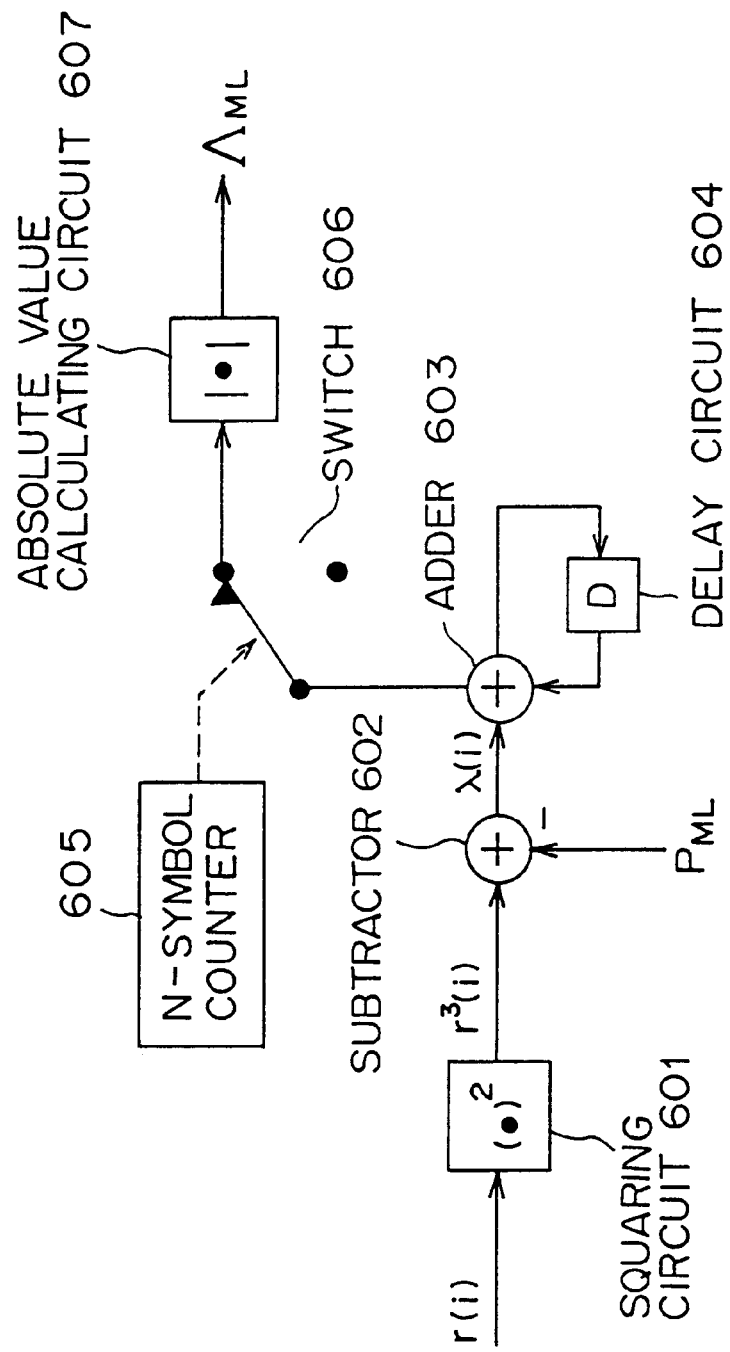
FIG. 7 shows the configuration of each estimating unit (a branch metric value calculating unit for estimating a modulation level) according to a second preferred embodiment of the present invention.

FIG. 7 shows the configuration according to a second preferred embodiment, which implements the QPSK estimating unit 202, the 16 QAM estimating unit 203, the 64 QAM estimating unit 204, or the 256 QAM estimating unit 2–5 shown in FIG. 3, according to the first preferred embodiment of the present invention. This figure shows a branch metric calculating module for estimating a modulation level. This configuration corresponds to the first modified embodiment according to the first principle of the present invention, which was referred to in the above described First Principle of the Present Invention.

With the configuration shown in FIG. 7, a subtractor 602 calculates a branch metric value $\lambda_i$ by subtracting an average carrier wave power value $P_{ML}$ (ML=QPSK, 16 QAM, 64 QAM, or 256 QAM) of each modulation level from the received signal power value $r^2$ (i=1, 2, ..., N) output from a squaring circuit 601 according to the above described equation (6).

Next, an accumulator composed of an adder 603 and a delay circuit 604 sequentially accumulates the branch metric value $\lambda_i$ output from the subtractor 602.

When an N-symbol counter 605 counts "N" symbols for one block, a switch 606 outputs the accumulated value.

An absolute value calculating circuit 607 calculates the absolute value of the accumulated value, and outputs the calculated absolute value as a likelihood function $\Lambda_{ML}$ (ML=QPSK, 16 QAM, 64 QAM, or 256 QAM).

With such a circuit configuration, the dynamic range of each circuit element can be reduced as described above.

FIG. 8 is a block diagram showing the configuration of a third preferred embodiment which employs an RSSI signal, according to the present invention. This configuration corresponds to the second modified emboldened according to the first principle of the present invention, which was referred to in the above described First Principle of the Present Invention. In this figure, the portions which relate to the first preferred embodiment and are denoted with the same reference numerals and symbols as those of FIG. 3 have the same capabilities as those of FIG. 3.

An RSSI signal indicates a received signal level. Normally, this signal is used not to measure an average power for one moment, which is referred to in this specification, but to measure an average received power for a longer period of time. Accordingly, this signal does not follow a fluctuation for one moment or a fluctuation occurring for a short period of time.

An RSSI measuring unit 702 coarsely estimates a modulation level at the time of a transmission by making a determination with a threshold, thereby reducing the estimation range of a modulation level.

In this sense, the estimated value of the modulation level obtained based on an RSSI signal can be also regarded as side information. By making both coarse and fine estimations as described above, a process load on a later stage where a large amount of computation is performed can be reduced.

As shown in FIG. 8, if the RSSI measuring unit 702 measures, for example, the received signal level corresponding to the 16 QAM modulation method, it provides a modulation level selector 701 with the selection signal ML_SEL for instructing only the three units such as the 16 QAM estimating unit 203, the QPSK estimating unit 202, and the 64 QAM estimating unit 204 among the four estimating units 202 through 205 to run.

As a result, the modulation level selector 701 instructs only the above described three estimating units to run by providing a received signal frame 201.

In this way, the total amount of computation can be reduced to three-fourths in comparison with the case where the estimation range of a modulation level is not reduced.

Figure 9:
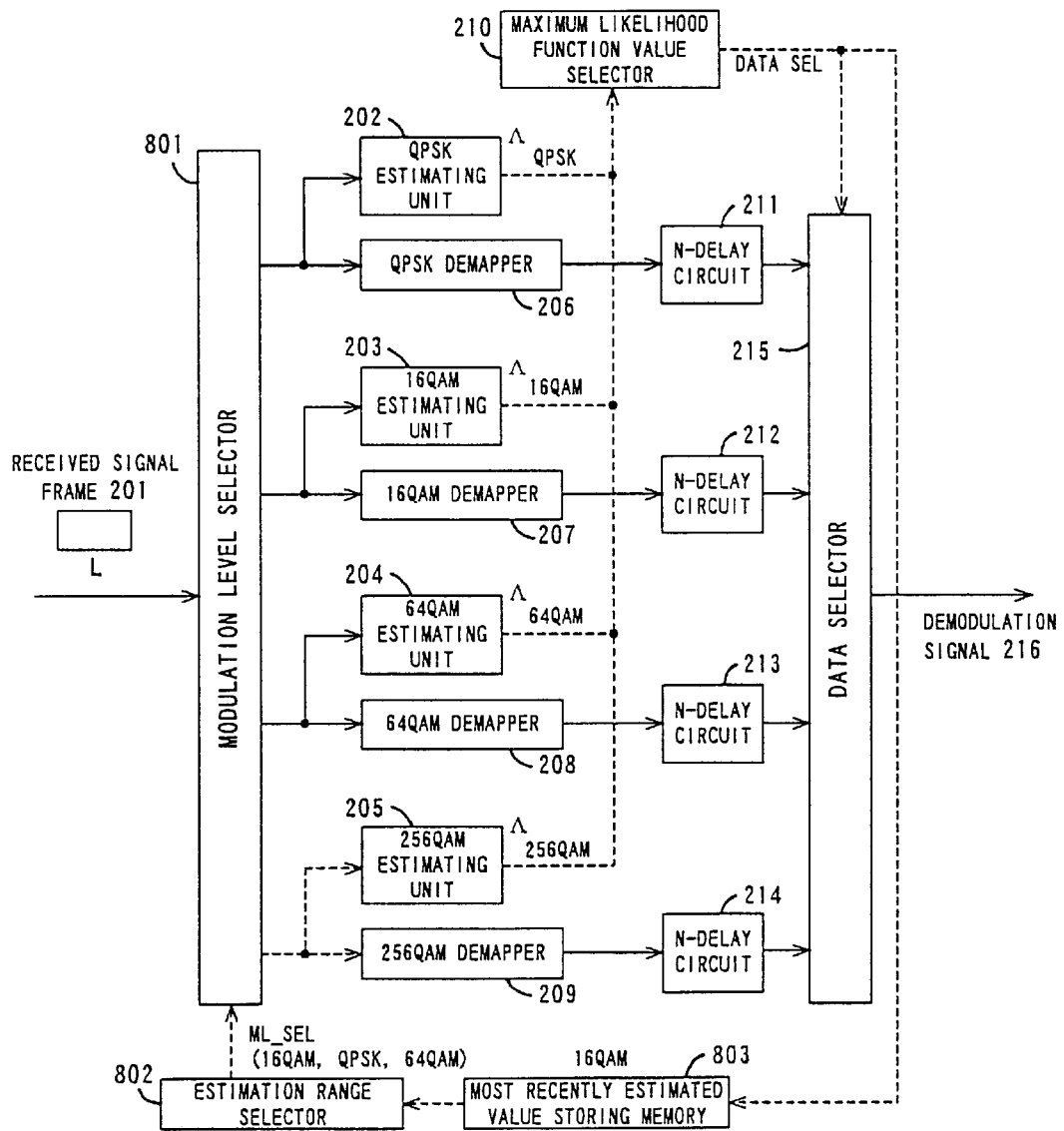
FIG. 9 shows the configuration employing an adaptive modulation method which performs up/down control of a modulation level, according to a fourth preferred embodiment of the present invention.

FIG. 9 is a block diagram showing the configuration of a fourth preferred embodiment which employs an adaptive modulation method for performing up/down control of a modulation level, according to the present invention. This corresponds to the third modified embodiment according the first principle of the present invention, which was referred to in the First Principle of the Present Invention. In this figure, the portions which relate to the first preferred embodiment and are denoted with the same reference numerals and symbols as those of FIG. 3 have the same capabilities as those of FIG. 3.

In the configuration shown in FIG. 9, the most recently estimated value selected by the maximum likelihood function value selector 210 is stored in a most currently estimated value storing memory 803.

An estimation range selecting unit 802 recognizes only the three states such as "±1" and "0" based on the most recently estimated value stored in the most recently estimated value storing memory 803 to be currently estimated values.

As shown in FIG. 9, if the most recently estimated value stored in the most recently estimated value storing memory 803 is the value of the 16 QAM modulation method, an estimated range selector 802 provides a modulation level selector 801 with the selection signal ML_SEL for instructing only the three estimating units such as the 16 QAM estimating unit 203, the QPSK estimating unit 202, and the 64 QAM estimating unit 204 among the four estimating units 202 through 205 to run.

As a result, the modulation level selector 801 instructs only the above described three estimating units to run by providing the received signal frame 201.

In this way, the total amount of computation can be reduced to three-fourths in comparison with the case where the estimation range of a modulation level is not reduced.

Figure 10:
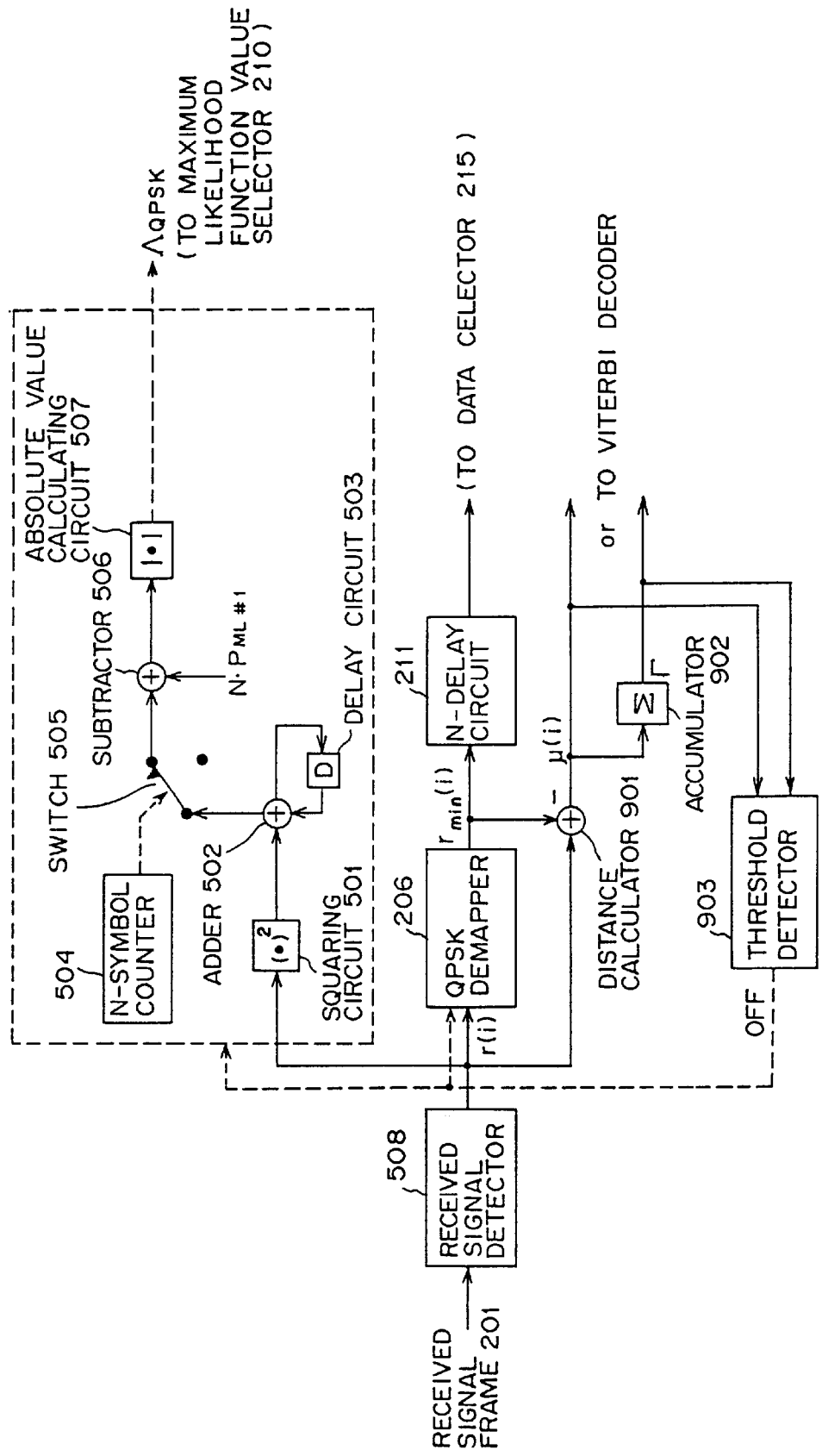
FIG. 10 shows the configuration of a fifth preferred embodiment according to the present invention, which is a method combined with a Viterbi decoding method.

FIG. 10 shows the configuration of a fifth preferred embodiment which is a system combined with a decoder using a Viterbi decoding method. This corresponds to the fourth modified embodiment according to the first principle of the present invention. In this figure, the portions which relate to the first preferred embodiment and are denoted with the same reference numerals as those of FIGS. 3 and 6 have the same capabilities as those of these figures. Although FIG. 10 illustrates only the portions relating to the QPSK modulation method, the other modulation methods have similar configurations.

In a Viterbi decoding algorithm, the likelihood value (branch metric value) $\mu(i)$ of a symbol is defined to be the square value of the distance between the vector r(i) detected by the received signal detector 508 and the signal point vector $r_{min}(i)$ closest thereto, that is, the following equation (7).

$$\mu(i)=(r(i)-r_{min}(i))^2 \tag{7}$$

By way of example, as the likelihood value $\mu(i)$ of the QPSK modulation method, a distance calculator 901 calculates the square value of the distance between the vector r(i) detected by the received signal detector 508 and the signal point vector $r_{min}(i)$ output from the QPSK demapper 206, as shown in FIG. 10.

Since the likelihood value $\mu(i)$ is used also for a modulation level estimation in this preferred embodiment, the likelihood value $\mu_{ML}(i)$ of the modulation level ML is defined by the following equation.

$$\mu_{ML}(i) = (r(i) - r_{min}^{(ML)}(i))^2 \tag{8}$$

If the following inequality (9) is satisfied regarding the threshold value $\epsilon$ against the likelihood value $\mu_{ML}$ (i), or if the following inequality (10) is satisfied regarding the parametric value $\Gamma_{ML}$ being an accumulated value of the branch metric value being the likelihood value $\mu_{ML}$ (i) against its corresponding threshold value E, the estimation and the decoding process for the corresponding modulation level is suspended.

$$\mu_{ML}(i) > \epsilon \tag{9}$$

$$\Gamma_{ML} > E \tag{10}$$

Note that the above described threshold value $\epsilon$ or E is determined based on the worst value of the Eb/No stipulated by the system according to the preferred embodiment of the present invention.

Here, assume that a QPSK signal is estimated when a 64 QAM signal is transmitted. With the 64 QAM modulation method, when the highest-power signal point r(i) is transmitted on the condition that no thermal noise exists, its coordinate will become, for example, (+7, +7). In the QPSK estimating unit 202, the signal point $r_{min}(i)$ closest to the above described signal point is (+1, +1). Accordingly, the likelihood value $\mu_{QPSK}(i)$ calculated for the QPSK modulation method is obtained as follows.

$$\mu_{QPSK}(i)=(7-1)^2+(7-1)^2=72 \tag{11}$$

Figure 11:
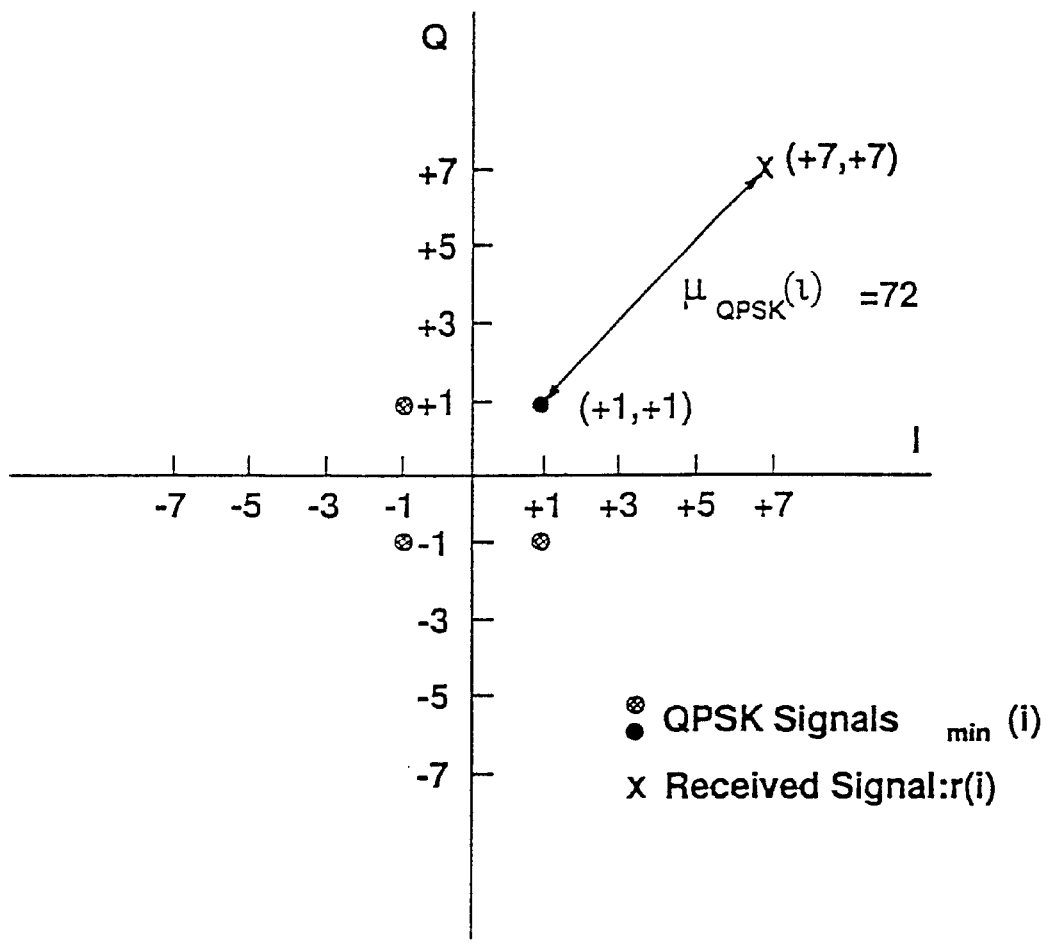
FIG. 11 exemplifies the case where a calculation operation is suspended as a result of a threshold determination according to the fifth preferred embodiment of the present invention.

As is known from FIG. 11, this likelihood value $\mu^{QPSK}(i)$ becomes 72, which is fairly larger than the distance between signal points (=2). In such a case, the estimation operation of the QPSK estimating unit 202 is suspended.

More specifically, a threshold detector 903 makes a comparison between the likelihood value $\mu(i)$ output from a distance calculator 902 or the accumulated value $\Gamma$ obtained by accumulating the above described likelihood value $\mu(i)$, and the corresponding threshold value $\epsilon$ or E. If the above described equation (9) or (10) is satisfied, the threshold detector 903 instructs the QPSK estimating unit 202 to suspend its operation.

With the above described configuration according to the fifth preferred embodiment of the present invention, the number of modulation level estimation errors can be reduced.

Figure 12:
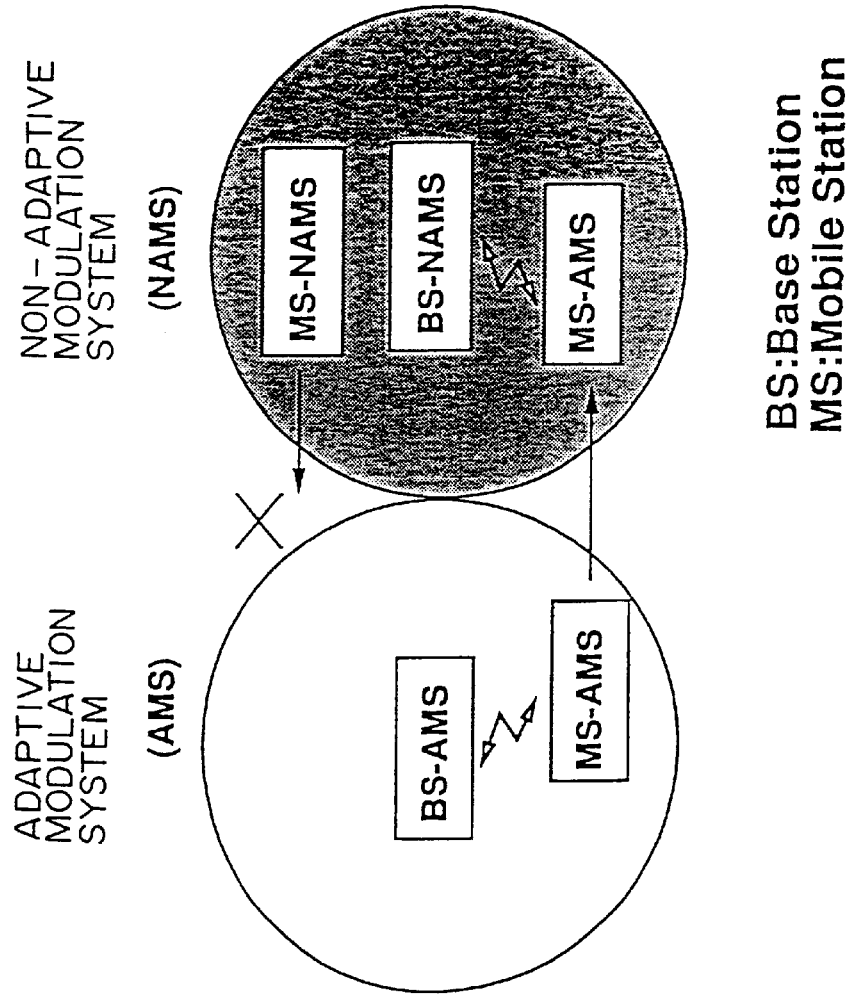
FIG. 12 shows the configuration of the system where adaptive and non-adaptive modulation methods coexist.

FIG. 12 shows the configuration of the system where a system using an adaptive modulation method being a prerequisite of the present invention, and a system using a non-adaptive modulation method coexist. This corresponds to the fifth modified embodiment according to the first principle of the present invention, which was referred to in the above described First Principle of the Present Invention.

With the configuration shown in FIG. 12, the systems which respectively use the adaptive and the non-adaptive modulation methods are configured as respective cells.

As described above, according to the present invention, there is no need to transmit a new control signal on a channel when a modulation level is changed, with an adaptive modulation method. Accordingly, the frame formats on the channel become exactly the same.

As a result, the system which can be applied to a non-adaptive modulation method by fixedly setting a modulation level, and which has no influence on a conventional system can be configured by preparing a base station and a terminal (mobile station) equipped with an adaptive modulation method according to the present invention.

Since the present invention is a technique closed only to a receiving side, receiver operations can be performed without being aware of the difference between systems. Namely, if a signal is transmitted by setting a modulation level to a fixed value on a transmitting side, an estimation result is always fixed to one particular modulation level also on a receiving side. Accordingly, the real coexistence of adaptive and non-adaptive modulation methods can be realized in the system where the adaptive modulation method is adopted to either of up- and down-links.

Additionally, the adaptive modulation system according to the present invention, can coexist with the non-adaptive modulation system, which does not require a feedback channel in, an FDD system having a channel on which the fading of an uplink does not correlate with that of a downlink, by being configured that signals are transmitted at the minimum modulation level (such as with the QPSK modulation method) if control information is not returned via a feedback channel (refer to 1508 shown in FIG. 1A) during a predetermined period of time after the transmission operations are performed.

Even in a system where the adaptive modulation method is adopted in both directions, the present invention still has an advantage that a common frame format can be used. Consequently, the commonality of an apparatus can be increased to its maximum in a dual mode system when a conventional system coexists (particularly at the time of a transition to a new system), and the effect of a reduction in the complexity of both a base station and a terminal (a reduction such as 1+1=1) can be expected.

Second Principle of the Present Invention

Provided next is the explanation about a second principle of the present invention.

With the adaptive modulation method according to the first principle of the present invention explained so far, the mean (primary moment) of a carrier wave power at each modulation level ML is used as a likelihood function $\Lambda_{ML}$ as represented by the above described equation (1). In this case, a relatively high accuracy is required for the average value (absolute value) of a received signal level.

Therefore, according to the second principle of the present invention, a comparison based on relative values can be made by using the variance of a carrier wave power being a secondary moment. As a result, an estimation with high accuracy can be made without using the mean (absolute value) of a received signal level itself.

Specifically, the second principle of the present invention considers the variance (secondary moment) of the CNR at each modulation level.

In a similar manner as in the case according to the first principle of the present invention, the average CNRs of modulation levels 2(QPSK), 4(16 QAM), and 6(64 QAM) are respectively $\gamma_{QPSK}=\delta/\sigma^2$, $\gamma_{16\ QAM}=5\delta/\sigma^2$, and $\gamma_{64\ QAM}=21\delta/\sigma^2$. Here, $2\delta$ is the (minimum) distance between signal points, and $\sigma^2$ is the variance of thermal noise. Additionally, the theoretical values of respective average bit error rates are calculated based on these average CNRS. As is known from these values, the average CNRs of the respective modulation levels differ from one another on the condition that the distance between signal points and the thermal noise, that is, Es/No are made identical, and the symbol error rates are made equal.

However, since the mean or the sample mean are absolute values, these values are required to be accurate a matter of course. In the meantime, a variance is a scale for representing the distribution from an average value as a numerical value, which eliminates the need for learning the absolute value of the average value. Accordingly, even if a received signal level is not obtained with a high accuracy, it has no influence on the estimation accuracy of a transmitted modulation level.

Here, assuming that the received signal point at a time point "i", its power is $r^2(r)$, which is defined to be a random variable x(i). According to the first principle of the present invention, the distance between the mean (primary moment) of the random variable x(i) defined by the following equation (12), and an average carrier wave power $x_m$ is recognized to be a likelihood function value, as represented by the equation (1).

$$\overline{x}(i) = \frac{\sum_{i}^{N} r^2(i)}{N} \tag{12}$$

Here, assume that a state change period (hereinafter referred to as a block length), which is preset by a system, is "L", and the number of symbols (an estimation block length) "N" used for an estimation is equal to or smaller than "L" (that is, N($\leq$L)). At this time, the variance (secondary moment) of the signal points of the received signal is defined by the following equations (13) through (15).

$$\sigma^2 = E(x^2) - E^2(x) \tag{13}$$

$$E(x^2) = \frac{\sum_{i}^{N} x^2(i)}{N} \tag{14}$$

$$E^2(x) = \left\{\frac{\sum_{i}^{N} x(i)}{N}\right\}^2 \tag{15}$$

Specifically, according to the second principle of the present invention, the variance of a received signal power is measured by using as offset values the variance of the average carrier wave powers ($P_{ML}$) such as $\sigma^2 P_{QPSK}=0.0$, $\sigma^2 P_{16\ QAM}=16.0$, and $\sigma^2 P_{64\ QAM}=336.0$ at the respective modulation levels when no thermal noise exists ($\sigma_N^2 \to 1$) and the distance between signal points is 2. At this time, the likelihood function $\Lambda_{ML}$ of a modulation level (ML) is represented by the following equation.

$$\Lambda_{ML} = \left|\sigma^2_{P_{ML}} - \sigma^2\right| \tag{16}$$

Accordingly, the likelihood functions $\Lambda_{QPSK}$, $\Lambda_{16\ QAM}$, and $\Lambda_{64\ QAM}$ corresponding to the respective modulation functions are represented by the following equations.

$$\Lambda_{QPSK} = |\sigma^2_{P_{QPSK}} - \sigma^2|, \tag{17}$$

$$\Lambda_{16QPSK} = |\sigma^2_{P_{16QAM}} - \sigma^2|, \tag{18}$$

$$\Lambda_{64QAM} = |\sigma^2_{P_{64QAM}} - \sigma^2|, \tag{19}$$

According to the second principle of the present invention, the likelihood function having the minimum value among the likelihood functions $\Lambda_{ML}$s corresponding to respective modulation levels is used as an estimation result of a modulation level in a similar manner as in the case according to the first principle. Therefore, the principle of a system configuration is like the one shown in FIG. 2, similar to the configuration according to the first principle of the present invention.

Note that, however, according to the second principle of the present invention, the distributions of signal points at respective modulation levels are different when identical measurement symbols are used even if the variance of thermal noise is the same in a similar manner as in the case according to the first principle of the present invention. This is because the number of symbols must be set to a larger value with the increase of a modulation level in order to make the frequency of occurrence of all the signal points at a certain modulation level same when a random information source is assumed. For example, there is the following relationship between the reliability $\upsilon_{ML}$ of the variance of an average carrier wave power (mean) at respective modulations levels if the number of samples is "N", which are represented by the equations (17) through (19).

$$v_{QPSK} > v_{16\ QAM} > v_{64\ QAM} \tag{20}$$

This means that the present invention is based on Law of Large Numbers, and the reliability $\upsilon_{ML}$ of the variance of an average carrier wave power (mean) at each modulation level approaches "∞" and the sample variance $\sigma^2(N)$ approaches a true value, as "N" is set to a larger value.

As described above, according to the second principle of the present invention, each likelihood function value is calculated on the condition that the number of samples "N" is set to a same value. Therefore, two parameters such as the variance $\sigma^2 N$ of thermal noise (which is common to respective modulation levels), and the reliability $\upsilon_{ML}$ of the variance of the carrier wave power (mean) of each modulation level must be considered.

The former variance depends on Es/No, while the latter variance depends on a modulation level (particularly on the modulation level having a maximum transmission efficiency). Especially, for the latter variance, if a sufficient number of samples cannot be measured (if "N" is small), a transmission error (an irreducible error) can occur even if there is no thermal noise. As a matter of course, if the number of measurement samples is small although the former (used for a conventional Viterbi decoding algorithm as a model assumption) is large, an estimation accuracy degrades in a similar manner as in the case according to the first principle of the present invention.

Accordingly, according to the second principle of the present invention, an estimation error of a modulation level, which is caused by the above described interaction, can be prevented from occurring if the number of samples "N" is set to some large value, in a similar manner as in the case according to the first principle of the present invention.

When a system design is designed, the number of samples "N", which satisfies the allowable value of an estimation error rate, is determined not only from the normalized maximum fading frequency viewpoint, but also from the block error rate (or the modulation level estimation error rate) viewpoint in a similar manner as in the case according to the first principle of the present invention.

By way of example, with the 64 QAM modulation method having the maximum transmission efficiency among the above described combination of the modulation levels, the estimation error rate is increased to as high as approximately $4 \times 10^{-4}$ when the number of symbols "N" is 50.

The above described number of symbols N=50 is the number equivalent to that of per pilot period (several tens of symbols), for example, if a transmission speed is lower than that of a pilot signal period "L" used for fading compensation. If the transmission speed is medium or high, the number of symbols becomes considerably smaller than that of per pilot period (several hundreds to several thousands of symbols).

That is, according to the second principle of the present invention, an estimation with a fairly high accuracy (errorless estimation) can be implemented particularly at a medium or a high speed if a modulation level is changed with the pilot signal period, in a similar manner as in the case according to the first principle of the present invention.

Described above is the fundamentals of the first principle of the present invention.

Meanwhile, a likelihood function can be considered as a sample variance of N random variables $x_1, \ldots x_N$ as follows.

$$\overline{v} = \frac{(x_1 - \overline{x})^2 + \ldots + (x_N - \overline{x})^2}{N} \tag{21}$$

where the sampling average x is:

$$\overline{x} = \frac{x_1 + \ldots + x_N}{N} \tag{22}$$

Each of the random variables has the same mean and variance represented by the following equations.

$$E(x_i) = P_{ML}, \tag{23}$$

$$\sigma^2_{xi} = \sigma^2_{P_{ML}} \tag{24}$$

These variables do not correlate with one another, that is:

$$E(x(i) - P_{ML})(x(j) - P_{ML}) = 0 \tag{25}$$

$$i \neq j \tag{26}$$

The mean at this time is:

$$E(\overline{v}) = \frac{N-1}{N} \sigma^2_{P_{ML}} \tag{27}$$

As a result, the distance between "N" sample variance $r_1, \ldots, r_N$ of received signals and the mean obtained by the above described equation (27) can be defined as a likelihood function value. Namely, an estimation accuracy can be improved by recognizing a received sequence as a random variable sequence in this way.

To be more specific, the variance of a received signal power is measured by using as offset values a coefficient {(N−1)/N} based on the number of measurement sample "N" and the variance of average carrier wave powers ($P_{ML}$) such as $\sigma^2 P_{QPSK}=0.0$, $\sigma^2 P_{16QAM}=16.0$, and $\sigma^2 P_{64\,QAM}=336.0$ at respective modulation levels when no thermal noise exists ($\sigma_N^2 \to 1$) and the distance between signal points is 2. At this time, the likelihood function $\Lambda_{ML}$ of a modulation level (ML) is represented by the following equation.

$$\Lambda_{ML}^* = \left| \frac{N-1}{N} \sigma_{P_{ML}}^2 - \bar{v} \right| \quad (28)$$

Accordingly, the likelihood functions $\Lambda_{QPSK}$, $\Lambda_{16\,QAM}$, and $\Lambda_{64\,QAM}$ corresponding to the respective modulation functions are represented by the following equations.

$$\Lambda_{QPSK}^* = \left| \frac{N-1}{N} \sigma_{P_{QPSK}}^2 - \bar{v} \right|, \quad (29)$$

$$\Lambda_{16QAM}^* = \left| \frac{N-1}{N} \sigma_{P_{16QAM}}^2 - \bar{v} \right|, \quad (30)$$

$$\Lambda_{64QAM}^* = \left| \frac{N-1}{N} \sigma_{P_{64QAM}}^2 - \bar{v} \right|, \quad (31)$$

Described above is the first modified embodiment according to the second principle of the present invention. Also in this embodiment, the likelihood function having the minimum value among the likelihood functions $\Lambda_{ML}$ corresponding to the respective modulation levels is used as an estimation result of a modulation level. Consequently, an estimation error rate can be decreased to $1.5 \times 10^{-4}$, approximately one-third of the rate obtained with a maximum likelihood estimation using the equations (17) through (19) based on the distribution of "N" symbols.

Furthermore, a particular improvement can be made by using the offset implemented in the above described first modified embodiment for the calculation of the variance $\sigma^2$ based on the equations (13) through (15). Specifically, the likelihood function $\Lambda_{ML}$ of each modulation level is obtained by the following equation.

$$\Lambda_{ML}^{**} = \left| \frac{N-1}{N} \sigma_{P_{ML}}^2 - \sigma^2 \right| \quad (32)$$

Accordingly, the likelihood functions $\Lambda_{QPSK}$, $\Lambda_{16\,QAM}$, and $\Lambda_{64\,QAM}$ are represented as follows.

$$\Lambda_{QPSK}^{**} = \left| \frac{N-1}{N} \sigma_{P_{QPSK}}^2 - \sigma^2 \right|, \quad (33)$$

$$\Lambda_{16QAM}^{**} = \left| \frac{N-1}{N} \sigma_{P_{64QAM}}^2 - \sigma^2 \right|, \quad (34)$$

$$\Lambda_{64QAM}^{**} = \left| \frac{N-1}{N} \sigma_{P_{64QAM}}^2 - \sigma^2 \right|, \quad (35)$$

Described above is the second modified embodiment according to the second principle of the present invention. As a result, an estimation error rate can be decreased to $3 \times 10^{-4}$, approximately three-fourths of the rate obtained with a maximum likelihood estimation using the equations (17) through (19) based on the variance of "N" symbols.

Preferred Embodiments According to the Second Principle of the Present Invention Provided below is the explanation about the details of preferred embodiments according to the second principle of the present invention.

As the fundamental configurations of the following sixth to eighth preferred embodiments, the above described configurations (shown in FIGS. 3, 8, 9, and 19) of the first to fifth preferred embodiments according to the first principle of the present invention can be adopted.

Figure 13:
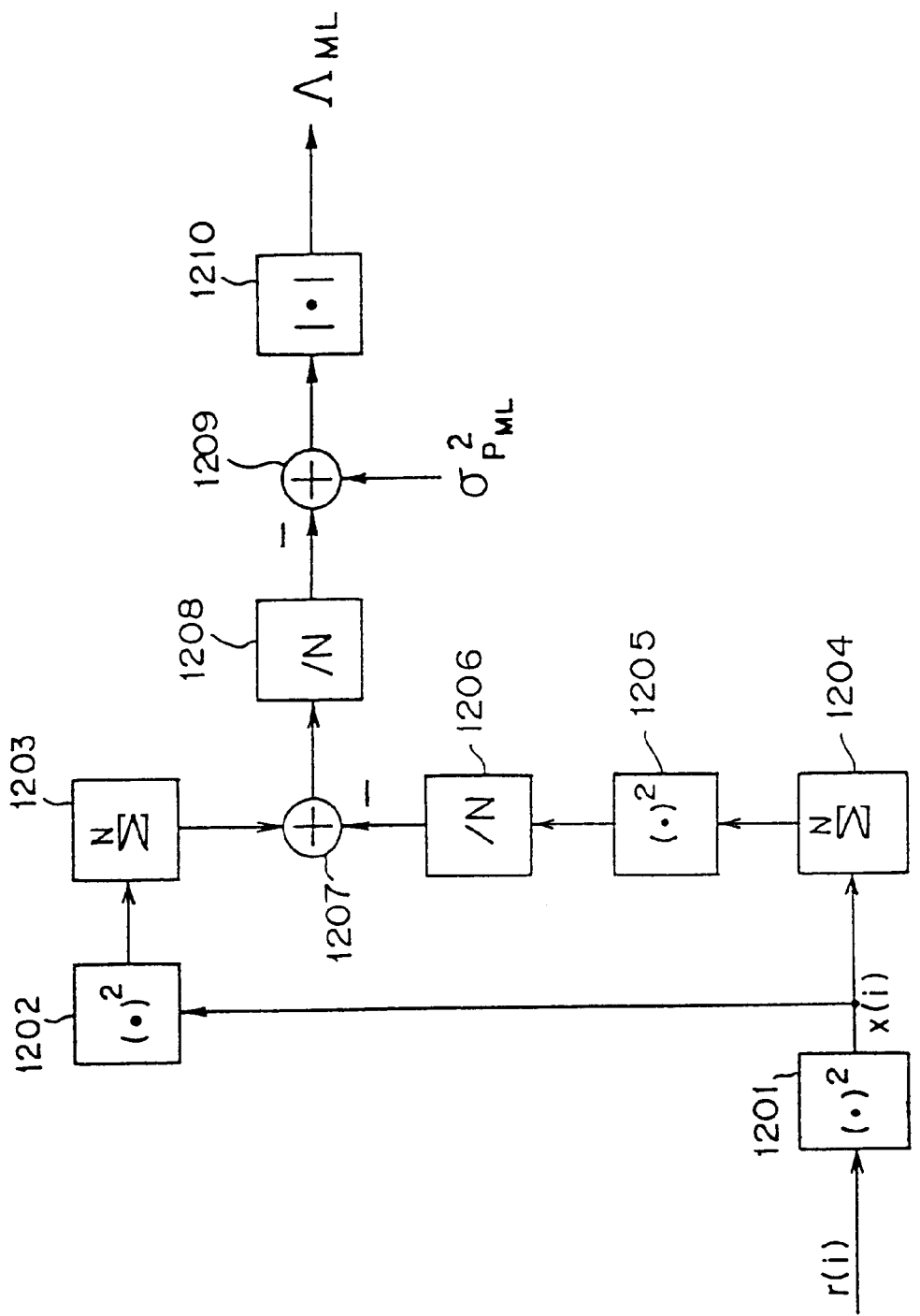
FIG. 13 shows the configuration of respective estimating units according to a sixth preferred embodiment of the present invention.

FIG. 13 shows the configuration of a sixth preferred embodiment according to the present invention, which implements the QPSK estimating unit 202, the 16 QAM estimating unit 203, the 64 QAM estimating unit 204, or the 256 QAM estimating unit 205, which are shown in FIG. 3, 8, 9, or 10. This is the preferred embodiment according to the second principle of the present invention.

In FIG. 13, squaring circuits 1201, 1202, and 1205, accumulators 1203 and 1204, a subtractor 1207, and dividers 1206 and 1208 calculate the distribution of a received signal point based on the above described equations (13) through (15).

A subtractor 1209 calculates the internal terms representing an absolute value on the right side of the equation (16).

An absolute value calculating circuit 1210 performs an absolute value calculation on the right side of the equation (16), and outputs a likelihood function value $\Lambda_{ML}$.

Figure 14:
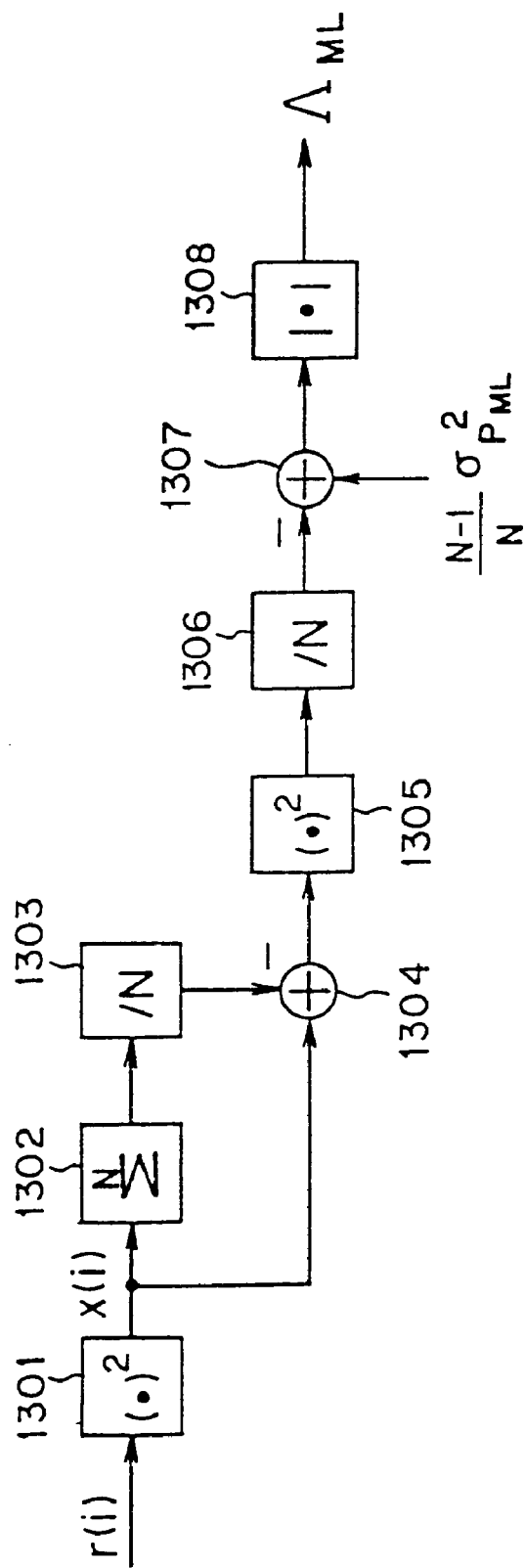
FIG. 14 shows the configuration of respective estimating units according to a seventh preferred embodiment of the present invention.

FIG. 14 shows the configuration of a seventh preferred embodiment according to the present invention, which implements the QPSK estimating unit 202, the 16 QAM estimating unit 203, the 64 QAM estimating unit 204, or the 256 QAM estimating unit 205, which are shown in FIG. 3, 8, 9, or 10. This corresponds to the first modified embodiment according to the second principle of the present invention.

In FIG. 14, a squaring circuit 1301, an accumulator 1302, and a divider 1301 calculates a sample mean based on the above described equation (22). A subtractor 1304, a squaring circuit 1305, and a divider 1306 calculates a sample variance based on the equation (21).

A subtractor 1307 calculates the internal terms representing an absolute value on the right side of the equation (28).

An absolute value calculating circuit 1308 performs an absolute value calculation on the right side of the equation (28), and outputs a likelihood function value $\Lambda_{ML}$.

Figure 15:
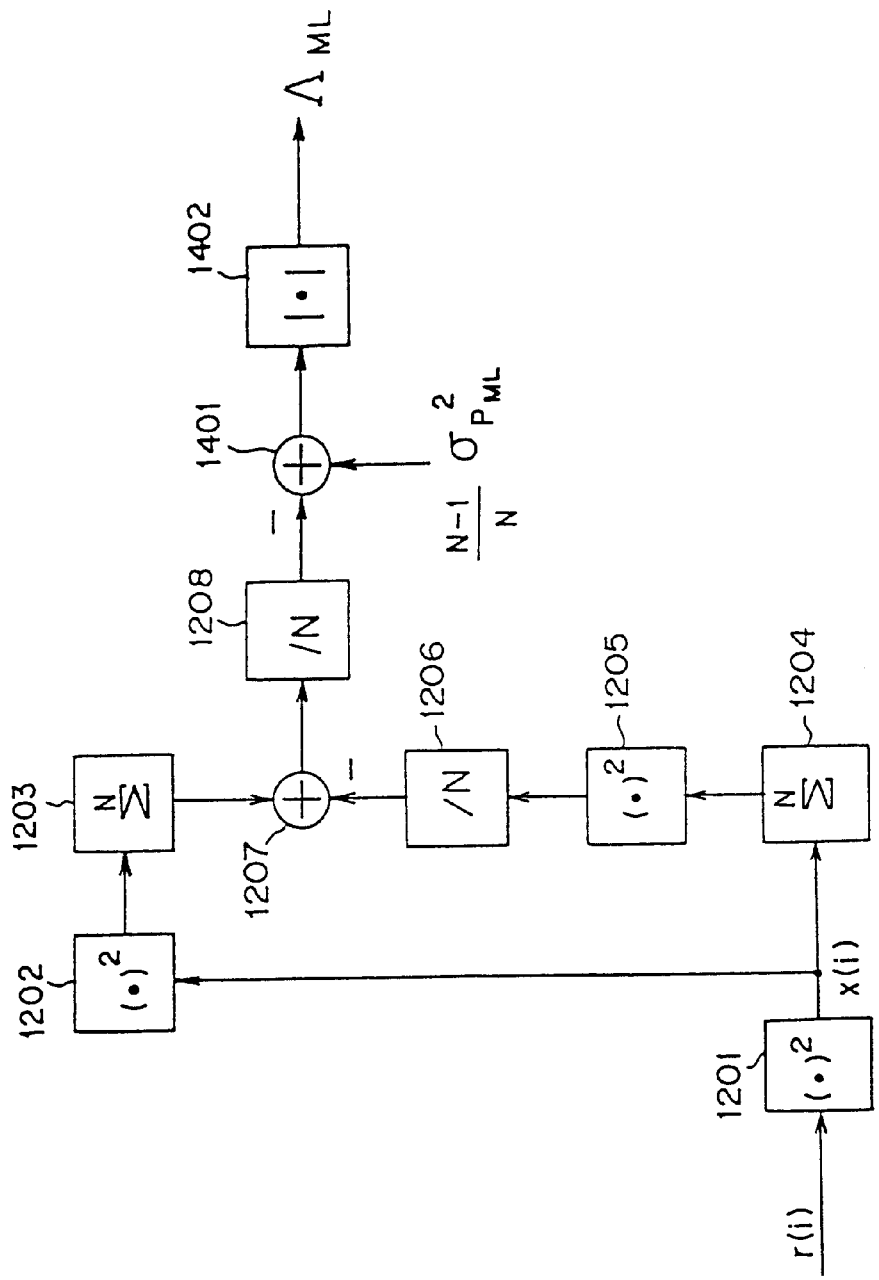
FIG. 15 shows the configuration of respective estimating units according to an eighth preferred embodiment of the present invention.

FIG. 15 shows the configuration of an eighth preferred embodiment according to the present invention, which implements the QPSK estimating unit 202, the 16 QAM estimating unit 203, the 64 QAM estimating unit, or the 256 QAM estimating unit 205, which are shown in FIG. 3, 8, 9, or 10. This so corresponds to the second modified embodiment according to the second principle of the present invention.

In FIG. 15, squaring circuits 1201, 1202, and 1205, accumulators 1203 and 1204, a subtractor 1207, and dividers 1206 and 1208 are similar to those shown in FIG. 13. That is, they calculate the variance of a received signal point based on the above described equations (13) through (15).

A subtractor 1401 calculates the internal terms representing an absolute value on the right side of the equation (32).

An absolute value calculating circuit 1402 performs an absolute value calculation on the right side of the equation (32), and outputs a likelihood function value $\Lambda_{ML}$.

What is claimed is:

1. A radio transmission method for adaptively changing a modulation level according to a channel condition comprising the steps of:

calculating mean of a carrier wave power for received signals to which no modulation level information is added when being transmitted;

calculating as a likelihood value of each modulation level a difference between the calculated mean of the carrier wave power of the received signal, and a mean of the carrier wave power, which is prescribed for each modulation level; and estimating as a modulation level of the received signal a modulation level corresponding to a maximum likelihood value among likelihood values of respective modulation levels.

2. The radio transmission method according to claim 1, further comprising the step of:
reducing an absolute value of the likelihood value by performing a likelihood value calculation for each received symbol.

3. The radio transmission method according to claim 1, further comprising the step of:
setting an estimation block length of a signal transmitted at a same modulation level according to an estimation error rate allowed by a system.

4. The radio transmission method according to claim 1, further comprising the steps of:
obtaining a received signal level; and
restricting a range of a modulation level for which the likelihood value is calculated based on the received signal level.

5. The radio transmission method according to claim 1, further comprising the step of:
restricting a range of a modulation level for which the likelihood value is calculated when a current estimation is made, based on a modulation level which is most recently estimated.

6. The radio transmission method according to claim 1, further comprising the step of:
suspending a subsequent estimation operation of the likelihood value for a corresponding modulation level if a distance between signal points exceeds a certain threshold.

7. The radio transmission method according to claim 1, further comprising the step of:
implementing a non-adaptive modulation method by fixedly setting a modulation level when being transmitted.

8. A radio transmission method for adaptively changing a modulation level according to a channel condition, comprising the steps of:
calculating a variance of a carrier wave power for received signals to which no modulation level information is added when being transmitted;
calculating as a likelihood value of each modulation level a difference between the calculated variance of the carrier wave power of the received signal, and a variance of the carrier wave power, which is prescribed for each modulation level; and
estimating as a modulation level of the received signal a modulation level corresponding to a maximum likelihood value among likelihood values of respective modulation levels.

9. The radio transmission method according to claim 8, further comprising the step of:
setting an estimation block length of a signal transmitted at a same modulation level according to an estimation error rate allowed by a system.

10. The radio transmission method according to claim 8, further comprising the steps of:
obtaining a received signal level; and
restricting a range of a modulation level for which the likelihood value is calculated based on the received signal level.

11. The radio transmission method according to claim 8, further comprising the step of:
restricting a range of a modulation level for which the likelihood value is calculated when a current estimation is made, based on a modulation level which is most recently estimated.

12. The radio transmission method according to claim 8, further comprising the step of:
suspending a subsequent estimation operation of the likelihood value at a corresponding modulation level if a distance between signal points exceeds a certain threshold.

13. The radio transmission method according to claim 8, further comprising the step of:
implementing a non-adaptive modulation method by fixedly setting a modulation level when being transmitted.

14. A radio transmission method for adaptively changing a modulation level according to a channel condition, comprising the steps of:
calculating a sample variance of a carrier wave power for received signals to which no modulation level information is added when being transmitted;
calculating as a likelihood value of each modulation level a difference between the calculated sample variance of the carrier wave power of the received signal, and a sample variance of the carrier wave power, which is prescribed for each modulation level; and
estimating as a modulation level of the received signal a modulation level corresponding to a maximum likelihood value among likelihood values of respective modulation levels.

15. The radio transmission method according to claim 14, further comprising the step of:
setting an estimation block length of a signal transmitted at a same modulation level according to an estimation error rate allowed by a system.

16. The radio transmission method according to claim 14, further comprising the steps of:
obtaining a received signal level; and
restricting a range of a modulation level for which the likelihood value is calculated based on the received signal level.

17. The radio transmission method according to claim 14, further comprising the step of:
restricting a range of a modulation level for which the likelihood value is calculated when a current estimation is made, based on a modulation level which is most recently estimated.

18. The radio transmission method according to claim 14, further comprising the step of:
suspending a subsequent estimation operation of the likelihood value for a corresponding modulation level if a distance between signal points exceeds a certain threshold.

19. The radio transmission method according to claim 14, further comprising the step of:
implementing a non-adaptive modulation method by fixedly setting a modulation level when being transmitted.

20. A radio transmission method for adaptively changing a modulation level according to a channel condition, comprising the steps of:
calculating a variance of a carrier wave power for received signals to which no modulation level information is added when being transmitted;
calculating as a likelihood value of each modulation level a difference between the calculated variance of the carrier wave power of the received signals, and a sample variance of the carrier wave power, which is prescribed for each modulation level; and estimating as a modulation level of the received signal a modulation level corresponding to a maximum likelihood value among likelihood values of respective modulation levels.

21. The radio transmission method according to claim 20, further comprising the step of:

setting an estimation block length of a signal transmitted at a same modulation level according to an estimation error rate allowed by a system.

22. The radio transmission method according to claim 20, further comprising the steps of:

obtaining a received signal level; and restricting a range of a modulation level for which the likelihood value is calculated based on the received signal level.

23. The radio transmission method according to claim 20, further comprising the step of:

restricting a range of a modulation level for which the likelihood value is calculated when a current estimation is made, based on a modulation level which is most recently estimated.

24. The radio transmission method according to claim 20, further comprising the step of:

suspending a subsequent estimation operation of the likelihood value for a corresponding modulation level if a distance between signal points exceeds a certain threshold.

25. The radio transmission method according to claim 20, further comprising the step of:

implementing a non-adaptive modulation method by fixedly setting a modulation level when being transmitted.

26. A radio transmission apparatus for adaptively changing a modulation level according to a channel condition, comprising:

a circuit for calculating a mean value of a carrier wave power for received signals to which no modulation level information is added when being transmitted;

a circuit for calculating as a likelihood value of each modulation level a difference between the calculated mean value of the carrier wave power of the received signal, and a mean value of the carrier wave power, which is prescribed for each modulation level; and a circuit for estimating as a modulation level of the received signal a modulation level corresponding to a maximum likelihood value among likelihood values of respective modulation levels.

27. The radio transmission apparatus according to claim 26, further comprising for each modulation level:

a circuit for calculating a square value of each received symbol;

a circuit for subtracting the mean value of the carrier wave power, which is prescribed for a corresponding modulation level, from the square value;

a circuit for accumulating a subtraction result by a predetermined number of symbols; and a circuit for calculating an absolute value of an accumulation result, and for outputting a calculation result as a likelihood value of the corresponding modulation level.

28. The radio transmission apparatus according to claim 26, wherein an estimation block length of a signal transmitted at a same modulation level is set according to an estimation error rate allowed by a system.

29. The radio transmission apparatus according to claim 26, further comprising:

a circuit for obtaining a received signal level; and a circuit for restricting a range of a modulation level for which the likelihood value is calculated, based on the received signal level.

30. The radio transmission apparatus according to claim 26, further comprising:

a circuit for storing a modulation level which is most recently estimated; and a circuit for restricting a range of a modulation level for which the likelihood value is calculated when a current estimation is made, based on the stored modulation level which is most recently estimated.

31. The radio transmission apparatus according to claim 26, further comprising:

a circuit for suspending a subsequent estimation operation of the likelihood value for a corresponding modulation level if a distance between signal points exceeds a certain threshold.

32. A radio transmission apparatus for adaptively changing a modulation level according to a channel condition, comprising:

a circuit for calculating a variance value of a carrier wave power for received signals to which no modulation level information is added when being transmitted;

a circuit for calculating as a likelihood value of each modulation level a difference between the calculated variance value of the carrier wave power of the received signal, and a variance value of the carrier wave power, which is prescribed for each modulation level; and a circuit for estimating as a modulation level of the received signal a modulation level corresponding to a maximum likelihood value among likelihood values of respective modulation levels.

33. The radio transmission apparatus according to claim 32, wherein an estimation block length of a signal transmitted at a same modulation level is set according to an estimation error rate allowed by a system.

34. The radio transmission apparatus according to claim 32, further comprising:

a circuit for obtaining a received signal level; and a circuit for restricting a range of a modulation level for which the likelihood value is calculated based on the received signal level.

35. The radio transmission apparatus according to claim 32, further comprising:

a circuit for storing a modulation level which is most recently estimated; and a circuit for restricting a range of a modulation level for which the likelihood value is calculated when a current estimation is made, based on the stored modulation level which is most recently estimated.

36. The radio transmission apparatus according to claim 32, further comprising:

a circuit for suspending a subsequent estimation operation of the likelihood value for a corresponding modulation level if a distance between signal points exceeds a certain threshold.

37. A radio transmission apparatus for adaptively changing a modulation level according to a channel condition, comprising:

a circuit for calculating a sample variance value of a carrier wave power for received signals to which no modulation level information is added when being transmitted;

a circuit for calculating as a likelihood value of each modulation level a difference between the calculated sample variance value of the carrier wave power of the received signal, and a sample variance value of the carrier wave power, which is prescribed for each modulation level; and a circuit for estimating as a modulation level of the received signal a modulation level corresponding to a maximum likelihood value among likelihood values of respective modulation levels.

38. The radio transmission apparatus according to claim 37, wherein an estimation block length of a signal transmitted at a same modulation level is set according to an estimation error rate allowed by a system.

39. The radio transmission apparatus according to claim 37, further comprising:

a circuit for obtaining a received signal level; and a circuit for restricting a range of a modulation level for which the likelihood value is calculated based on the received signal level.

40. The radio transmission apparatus according to claim 37, further comprising:

a circuit for storing a modulation level which is most recently estimated; and a circuit for restricting a range of a modulation level for which the likelihood value is calculated when a current estimation is made, based on the stored modulation level which is most recently estimated.

41. The radio transmission apparatus according to claim 37, further comprising:

a circuit for suspending a subsequent estimation operation of the likelihood value for a corresponding modulation level if a distance between signal points exceeds a certain threshold.

42. A radio transmission apparatus for adaptively changing a modulation level according to a channel condition, comprising:

a circuit for calculating a variance value of a carrier wave power for received signals to which no modulation level information is added when being transmitted;

a circuit for calculating as a likelihood value of each modulation level a difference between the calculated variance value of the carrier wave power of the received signal, and a sample variance value of the carrier wave power, which is prescribed for each modulation level; and a circuit for estimating as a modulation level of the received signal a modulation level corresponding to a maximum likelihood value among likelihood values of respective modulation levels.

43. The radio transmission apparatus according to claim 42, wherein an estimation block length of a signal transmitted at a same modulation level is set according to an estimation error rate allowed by a system.

44. The radio transmission apparatus according to claim 42, further comprising:

a circuit for obtaining a received signal level; and a circuit for restricting a range of a modulation level for which the likelihood value is calculated based on the received signal level.

45. The radio transmission apparatus according to claim 42, further comprising:

a circuit for storing a modulation level which is most recently estimated; and a circuit for restricting a range of a modulation level for which the likelihood value is calculated when a current estimation is made, based on the stored modulation level which is most recently estimated.

46. The radio transmission apparatus according to claim 42, further comprising:

a circuit for suspending a subsequent estimation operation of the likelihood value for a corresponding modulation level if a distance between signal points exceeds a certain threshold.

* * * * *